United States Patent
Adachi et al.

(10) Patent No.: US 11,555,229 B2
(45) Date of Patent: Jan. 17, 2023

(54) HIGH-STRENGTH ALUMINUM ALLOY LAMINATED MOLDING AND PRODUCTION METHOD THEREFOR

(71) Applicants: KOIWAI CO., LTD., Odawara (JP); TOYO ALUMINIUM KABUSHIKI KAISHA, Osaka (JP)

(72) Inventors: Mitsuru Adachi, Odawara (JP); Jun Kusui, Osaka (JP); Daisuke Terada, Narashino (JP); Hideharu Nakashima, Chikushino (JP); Masatoshi Mitsuhara, Onojo (JP); Shigeto Yamasaki, Saga (JP)

(73) Assignees: KOIWAI CO., LTD., Odawara (JP); TOYO ALUMINUM KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/665,832

(22) Filed: Oct. 28, 2019

(65) Prior Publication Data

US 2020/0063241 A1    Feb. 27, 2020

Related U.S. Application Data

(63) Continuation-in-part of application No. PCT/JP2018/008262, filed on Mar. 5, 2018.

(30) Foreign Application Priority Data

Apr. 27, 2017  (JP) .............................. JP2017-088085
Feb. 20, 2018  (JP) .............................. JP2018-028284

(51) Int. Cl.
  *C22C 21/02*    (2006.01)
  *B33Y 70/00*    (2020.01)
  (Continued)

(52) U.S. Cl.
  CPC ................ *C22C 21/02* (2013.01); *B22F 3/24* (2013.01); *B22F 10/10* (2021.01); *B33Y 70/00* (2014.12);
  (Continued)

(58) Field of Classification Search
  CPC ... C22C 21/02; C22C 32/0078; C22C 1/0416; C22C 1/05; C22C 21/00; B22F 10/10;
  (Continued)

(56) References Cited

U.S. PATENT DOCUMENTS

2007/0037509 A1*  2/2007  Renz ..................... B22F 10/00
                                              454/354
2013/0115129 A1   5/2013  Xing et al.
(Continued)

FOREIGN PATENT DOCUMENTS

CN    103003458 A    3/2013
CN    103328668 A    9/2013
(Continued)

OTHER PUBLICATIONS

Xue et al., CN 105386036A, machine translation (Year: 2016).*
(Continued)

*Primary Examiner* — John A Hevey
(74) *Attorney, Agent, or Firm* — Oliff PLC

(57) ABSTRACT

An aluminum alloy additive manufacturing product and a method manufactures the same. The aluminum alloy additive manufacturing product is formed by molding a raw metal by an additive manufacturing method. The raw metal is made of an aluminum alloy. The aluminum alloy contains Fe and one or more of Mn and Cr. The Fe is an inevitable impurity of 0.3 weight % or less. The one or more of Mn and Cr have a total weight of 0.3 to 10 weight %. The aluminum alloy additive manufacturing product contains any one or more of an intermetallic compound and an aluminum alloy
(Continued)

solid solution. The intermetallic compound contains two or more of Al, Mn, Fe, and Cr. One or more elements of Mn, Fe, and Cr are dissolved in the aluminum alloy solid solution.

9 Claims, 3 Drawing Sheets

(51) Int. Cl.
  *B33Y 10/00* (2015.01)
  *B33Y 80/00* (2015.01)
  *B22F 3/24* (2006.01)
  *B22F 10/10* (2021.01)
(52) U.S. Cl.
  CPC ... *B22F 2003/248* (2013.01); *B22F 2301/052* (2013.01); *B33Y 10/00* (2014.12); *B33Y 80/00* (2014.12)
(58) Field of Classification Search
  CPC .............. B22F 3/24; B22F 2003/248; B22F 2301/052; B22F 10/00; B33Y 70/00; B33Y 10/00; B33Y 80/00; Y02P 10/25
  See application file for complete search history.

(56) References Cited

U.S. PATENT DOCUMENTS

| | | | | |
|---|---|---|---|---|
| 2013/0307383 A1* | 11/2013 | Suzuki | ............... | C22F 1/043 |
| | | | | 312/223.1 |
| 2015/0135897 A1* | 5/2015 | Sutcliffe | ............ | C22C 21/06 |
| | | | | 75/249 |
| 2017/0016093 A1 | 1/2017 | Karlen et al. | | |
| 2017/0016094 A1* | 1/2017 | Karlen | ............ | C22C 1/0416 |
| 2018/0126457 A1* | 5/2018 | Hou | ................. | B22F 1/02 |
| 2018/0304373 A1* | 10/2018 | Han | ............... | B22F 7/008 |
| 2019/0032175 A1* | 1/2019 | Martin | ............ | C22C 21/10 |

FOREIGN PATENT DOCUMENTS

| | | | |
|---|---|---|---|
| CN | 105386036 A | * | 3/2016 |
| EP | 2 415 889 A1 | | 2/2012 |
| JP | H05-009641 A | | 1/1993 |
| JP | H05-025502 A | | 2/1993 |
| JP | H05-171327 A | | 7/1993 |
| JP | H08-232053 A | | 9/1996 |
| JP | H10-317008 A | | 12/1998 |
| JP | H11-226723 A | | 8/1999 |
| JP | 2002-206133 A | | 7/2002 |
| JP | 2015-525290 A | | 9/2015 |
| WO | 2013/179017 A1 | | 12/2013 |
| WO | 2017/041006 A1 | | 3/2017 |

OTHER PUBLICATIONS

Baudana et al.; "Electron Beam Melting of Ti—48Al—2Nb—0.7Cr—0.3Si: Feasibility investigation;" Intermetallics; 2016; pp. 43-49; vol. 73.

Adachi et al.; "Formation of light metal using additive manufacturing method;" Journal of The Japan Institute of Light Metals; 2016; pp. 360-367; vol. 66, No. 7.

Kusaba et al.; "Effect of preheating temperature of SLM base plate on ultimate tensile strength of Al—10Si—0.3Mg alloy;" Japan Institute of Metals and Material autumn meeting proceedings; 2016; pp. 363.

Shibue; "Rapidly solidified aluminum alloys;" Journal of The Japan Institute of Light Metals; 1989; pp. 850-862; vol. 39.

May 15, 2018 Search Report issued in International Patent Application No. PCT/JP2018/008262.

May 1, 2018 Office Action issued in Japanese Patent Application No. 2018-028284.

Jun. 26, 2018 Office Action issued in Japanese Patent Application No. 2018-028284.

Jan. 7, 2020 Partial Search Report issued in European Patent Application No. 18790665.6.

* cited by examiner

HIGH-STRENGTH ALUMINUM ALLOY LAMINATED MOLDING AND PRODUCTION METHOD THEREFOR

FIELD

The present invention relates to a high-strength aluminum alloy additive manufacturing product and a method for manufacturing the same. The present invention relates to a high-strength aluminum alloy additive manufacturing product in which generation of distortion and crack inside and outside the additive manufacturing product during additive manufacturing of a complex forming body are reduced, and a method for manufacturing the same.

BACKGROUND

Conventionally, various studies have been conducted on a room-temperature high-strength alloy, a high-temperature high-strength alloy, a high-ductility alloy, and the like. As a method for manufacturing high-quality metal products from these alloys, processing methods, such as extrusion and forging, have been generally known. In these processing methods, a material that has been casted once is processed, and therefore, a final product internally has almost no defect, thus providing a high-quality and high-strength metal product (for example, see Patent Literature 1).

There has been known a method where a metal powder formed by rapid solidification by an atomization method is performed with sealed tube and degassing treatment, and molded by extrusion and the like. With this method, since an alloy having a composition that cannot be manufactured by the conventional casting can be used, a high-strength product can be manufactured. This method has been examined a lot especially for an aluminum alloy (for example, see Patent Literature 2).

There has been known a powder metallurgy method where a metal powder is prepared, and after that, the metal powder is sintered to produce one close to a final product shape. Since an alloy having a composition that cannot be manufactured by the conventional casting method can be used, this method can be expected to obtain a high-performance and high-strength material (for example, see Patent Literature 3).

Furthermore, there has been known a powder metallurgy method where a different metal powder is prepared, and rotated by a mechanical alloying method to generate a new alloy material. Since an alloy having a composition that cannot be used by the conventional casting method can be used, this method can be expected for manufacturing a high-performance and high-strength product (for example, see Patent Literature 4).

As a method for casting an aluminum molten metal, a vacuum die-casting method without air entrainment has been known. Since the molten metal is poured into a mold kept vacuum at a speed exceeding 10 m/s, a speed in solidification range is high at 100 m/s, and thus a product that has a fine micro structure, an intermetallic compound, and almost no defect can be obtained (for example, see Patent Literature 5).

Furthermore, as a method for casting an aluminum molten metal, there has been known a squeeze casting method where the molten metal is filled inside the mold at a low speed so as not to entrain air. With this method, since the air is not trapped in because of the low speed filling at a gate speed of 0.5 m/s or less, and moreover, pressure is applied at a high pressure of 100 MPa, a metal product that has a fine micro structure and almost no defect can be obtained (for example, see Patent Literature 6).

There has been known a metal additive manufacturing method where a metal powder is spread all over layer by layer, irradiated with a laser beam, an electron beam, or the like, and laminated while only a specific part is melted and solidified, thus forming a final product without a mold. An aluminum product formed using this manufacturing method is known to exhibit a strength higher than that of the molded body obtained by the conventional manufacturing method (for example, see Non Patent Literature 1).

CITATION LIST

Patent Literature

Patent Literature 1: Japanese Unexamined Patent Application Publication No. 8-232053
Patent Literature 2: Japanese Unexamined Patent Application Publication No. 5-25502
Patent Literature 3: Japanese Unexamined Patent Application Publication No. 10-317008
Patent Literature 4: Japanese Unexamined Patent Application Publication No. 5-9641
Patent Literature 5: Japanese Unexamined Patent Application Publication No. 2002-206133
Patent Literature 6: Japanese Unexamined Patent Application Publication No. 5-171327

Non Patent Literature

Non Patent Literature 1: Adachi et al., Journal of Japan Institute of Light Metals, 66(2016), 360-367
Non Patent Literature 2: Kusaba et al., The Japan Institute of Metals and Materials annual fall meeting (2016), 363
Non Patent Literature 3: Shibue, Journal of Japan Institute of Light Metals, 39(1989), 850-861

SUMMARY OF INVENTION

Technical Problem

According to the above-described conventional methods for manufacturing metal product disclosed in Patent Literatures, there are some problems in obtaining the final product.

With the method for manufacturing metal product disclosed in Patent Literature 1, a problem arises in that since it is difficult to manufacture a three-dimensionally complicated and fine final product, the shape of a target product is limited to a flat and smooth product.

With the method for manufacturing metal product disclosed in Patent Literature 2, since a rapidly solidified powder is used for a starting material, a product having an alloy composition completely different from that of the conventional casting method can be manufactured. However, a problem arises in that, since it is necessary to remove a water and a crystal water on a powder surface before the extrusion molding, degassing at 200° C. or more and keeping at 400° C. or more during the extrusion are required, and then, original characteristics of the metal powder are lost, thus the characteristics of the powder are not necessarily maintained. There is also a problem that a mechanical characteristic is different between an extrusion direction and its perpendicular direction.

With the method for manufacturing metal product disclosed in Patent Literature 3, a problem arises in that while a product having a new characteristic can be obtained by sintering, the product is not a rapidly solidified structure, and many manufacturing processes are needed to manufacture the final product.

With the conventional manufacturing method disclosed in Patent Literature 4, while a new alloy can be manufactured from a different metal powder, a problem arises in that it takes a time and it is complicated to generate a new alloy with the method by mechanical alloying therefor.

With the method for manufacturing metal product disclosed in Patent Literature 5, molding in a vacuum and pressure applying at a pressure about 100 MPa provides a large-sized and high-quality thin casting. However, because of an injection at a high speed, there is a restriction that Mn needs to be added as a transition metal to restrain adherence of the mold and the aluminum molten metal instead of adding a large amount of iron, and there is a problem that since it is a casting product, a hot cracking is possibly generated depending on the alloy composition, and thus the alloy composition is restricted.

While the method for manufacturing metal product disclosed in Patent Literature 6 is a method for manufacturing a casting used for casting an important safety component, such as an aluminum wheel, component segregation easily occurs because of a high pressure casting, and a countermeasure to this is necessary.

The additive manufacturing product of aluminum alloy disclosed in Non Patent Literature 1 is a method that provides the high-strength because casting defect is few and a rapidly solidified structure is included, but a molding condition during additive manufacturing is not clear and a countermeasure for obtaining further high-strength is required.

Non Patent Literature 2 has a description for an Al-10% Si—Mg alloy that since a distortion occurs in the product generated by the additive manufacturing method, it is ordinary to ordinarily preheat an additive manufactured substrate to close to 200° C. It is also described that increasing the preheating temperature decreases hardness, especially, the proximity of the substrate where the additive manufacturing time is long is affected by heat to be easily softened. Therefore, for restraining the reduction in hardness while the distortion is reduced, it is considered effective to increase a holding temperature during the additive manufacturing as much as possible to a temperature immediately before averaging where the material softens. However, it is difficult depending on the product shape in some cases to reduce the distortion without decrease in hardness and tensile strength.

While Patent Literatures and Non Patent Literatures have not described up to present, the inventors have found occurrence of various deformations and cracks from the results of additive manufacturing of various aluminum alloys.

That is, the occurrence of (1) deformation of the additive manufacturing product, (2) intergranular cracking of the additive manufacturing product, (3) cracking of support between substrate plate and additive manufacturing material, and (4) cracking at various places on the additive manufacturing products (additive direction, additive perpendicular direction) due to the distortion during the additive manufacturing have been found.

The deformation (1) easily occurs on the above-described Al-10% Si—Mg alloy. A low additive manufacturing temperature, for example, 100° C. or less easily causes deformation depending on the shape of the product to be additive manufactured, and fails to provide a product in some cases. A high additive manufacturing temperature close to 200° C. causes a small deformation of the product shape, but the product softens due to the overaging, and it is difficult to obtain a high tensile strength at a place affected by heat for a long time close to the substrate.

FIG. 1 is a photograph illustrating the deformation of the conventional additive manufacturing product.

The intergranular cracking (2) occurs on the alloy that easily cracks by the conventional casting method, for example, a low Si alloy, such as 6061, and an alloy having a wide solidification temperature range, such as 7075. This type of alloy is an alloy having a high strength obtained by extruding or rolling a billet obtained by a continuous casting method. The former has a high proof stress about 275 MPa, and the latter has a proof stress about 400 MPa and a tensile strength of 500 MPa.

For these alloys, while the distortion of the laminated product can be reduced by setting the additive manufacturing temperature close to 200° C., since the intergranular cracking still occurs inside the additive manufacturing product, the lamination material cannot serve as a product. Therefore, the strength to be originally obtained cannot be obtained.

For the alloy containing Mg as a main additive element, for example, AC7A as Al-5% Mg alloy and the above-described 7075, a casting crack is possibly generated on a corner portion of the product depending on the product shape.

While setting the temperature during additive manufacturing to 250° C. or more leads to the reduction of the crack, a precipitate that is already contained in the alloy and contributes to precipitation hardening, for example, a Mg—Si compound and a compound of two or more elements of Cu, Mg, Zn, and Al, has been coarsened at the termination of the additive manufacturing, and does not contribute to the precipitation hardening. Therefore, a solution treatment, a quenching, and a tempering treatment are necessary to obtain the strength, and performing these treatments possibly causes the deformation of the product in a case of a complex product. In view of this, a product having a high-strength in the as build state without a crack is required.

FIG. 2 is a photograph illustrating an intergranular cracking of the conventional additive manufacturing product.

The crackings (3) and (4) are likely to be generated in a case of a heat-resistant alloy. It has been known that a large amount of transition metal is added to increase a heat-resistant strength (see Non Patent Literature 3). However, different from the method for solidification molding of the powder described in the document, a metal additive manufacturing method is a method for completely melting the powder, and a rapid dissolution and a rapid solidification are repeated during the additive manufacturing. Therefore, at the temperature of 200° C. or less, for example, adding Fe to aluminum by 7% or more or adding 2% of Mn and 3% of Fe to aluminum is likely to generate a large crack on a surface of and inside the additive manufacturing product. Accordingly, a tensile specimen cannot be extracted, and then, a strength evaluation cannot be performed.

FIG. 3 is a photograph illustrating a cracking of the conventional additive manufacturing product.

The present invention has been made under the above-described circumstance, and its objective is to provide an aluminum alloy additive manufacturing product having a strength higher than that of a conventional additive manufacturing product.

It is also an objective of the present invention to provide a method for manufacturing an aluminum alloy additive manufacturing product having a strength higher than that of a conventional additive manufacturing product.

Furthermore, it is an objective of the present invention to provide a method for manufacturing an aluminum alloy additive manufacturing product where a cracking is not generated inside and outside the additive manufacturing product during additive manufacturing, a deformation is small, and a strength is higher than that of a conventional additive manufacturing product.

Specifically, because of a small constraint due to a solidification characteristic during casting and also a rapidly solidified structure, the aluminum alloy additive manufacturing product has application range expanded to alloy components that conventionally have not been thought of, and thus, while using the most of its characteristics, the objectives are as follows.

(1) When the additive manufacturing time is long and it is easily to be affected by heat even if the forming can be performed at not high temperature during additive manufacturing in a state where the overaging is less likely to occur, or when a high temperature additive manufacturing is necessary for a required high dimensional accuracy in addition to extremely reduced deformation, the overaging easily occurs to cause softening.

Even in such a state, a method for manufacturing a metal additive manufacturing product that contains an alloy component not softening the additive manufacturing product or has an alloy composition hardening an aluminum matrix by multiple fine intermetallic compounds, and thereby has a high hardness and a high tensile strength also at a room temperature and a high temperature corresponding to a purpose of use of the additive manufacturing product is provided.

(2) It is provided that a method for manufacturing a metal additive manufacturing product where an alloy composition is limited corresponding to a purpose of use of the additive manufacturing product, and a holding temperature during additive manufacturing and a heating temperature after termination of additive manufacturing are limited to predetermined temperature ranges to reduce cracking and deformation of the additive manufacturing product and residual stress stored inside.

Solution to Problem

To solve the above-described problems, a first aspect of the present invention provides an aluminum alloy additive manufacturing product formed by molding a raw metal by a lamination method. The raw metal is made of an aluminum alloy. The aluminum alloy contains Fe and one or more of Mn and Cr. The Fe is an inevitable impurity of 0.3 weight % or less. The one or more of Mn and Cr have a total weight of 0.3 to 10 weight %. The aluminum alloy additive manufacturing product contains any one or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

Alternatively, the first aspect of the present invention provides an aluminum alloy additive manufacturing product formed by molding a raw metal powder by an additive manufacturing method. The raw metal powder is made of an aluminum alloy. The aluminum alloy contains Fe and Mn. The Fe is an inevitable impurity of 0.3 weight % or less. The Mn is 0.3 to 10 weight %. The aluminum alloy additive manufacturing product contains an intermetallic compound that contains two or more of Al, Mn, and Fe.

In the aluminum alloy additive manufacturing product according to the first aspect of the present invention, the aluminum alloy may further contain any one or more elements of 1 to 20 weight % Si, 0.2 to 7.0 weight % Mg, 0.5 to 5 weight % Cu, and 0.5 to 3 weight % Ni.

In the aluminum alloy additive manufacturing product according to the first aspect of the present invention, the aluminum alloy may contain 4 to 15 weight % Si and 0.2 to 1.0 weight % Mg, and the total weight of Mn and Cr may be 0.3 to 2.5 weight %.

In the aluminum alloy additive manufacturing product according to the first aspect of the present invention, the aluminum alloy may contain 8 to 20 weight % Si, 0.5 to 2.0 weight % Mg, 0.5 to 5 weight % Cu, and 0.5 to 3 weight % Ni, and the total weight of Mn and Cr may be 1.5 to 5.0 weight %.

In the aluminum alloy additive manufacturing product according to the first aspect of the present invention, the aluminum alloy may contain 1 to 3 weight % Si and 4.0 to 6.0 weight % Mg, and the total weight of Mn and Cr may be 0.5 to 2.5 weight %.

The second aspect of the present invention provides an aluminum alloy additive manufacturing product formed by molding a raw metal by an additive manufacturing method. The raw metal is made of an aluminum alloy. The aluminum alloy contains Fe and one or more of Mn and Cr. The weight % of Fe exceeds 0.3 and is 2 or less. The one or more of Mn and Cr have a total weight of exceeding 1.5 weight % and 10 weight % or less. The aluminum alloy additive manufacturing product contains anyone or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

Alternatively, the second aspect of the present invention provides an aluminum alloy additive manufacturing product formed by molding a raw metal powder by an additive manufacturing method. The raw metal powder is made of an aluminum alloy. The aluminum alloy contains Fe and Mn. The weight % of Fe exceeds 0.3 and is 2 or less. The weight % of Mn exceeds 1.5 and is 10 or less. The aluminum alloy additive manufacturing product contains an intermetallic compound that contains two or more of Al, Mn, and Fe.

The third aspect of the present invention provides an aluminum alloy additive manufacturing product formed by molding a raw metal by an additive manufacturing method. The raw metal is made of an aluminum alloy. The aluminum alloy contains Fe and one or more of Mn and Cr. The weight % of Fe exceeds 1 and is 10 or less. The one or more of Mn and Cr have a total weight of 1.5 weight % or less. The aluminum alloy additive manufacturing product contains any one or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

Alternatively, the third aspect of the present invention provides an aluminum alloy additive manufacturing product formed by molding a raw metal powder by a lamination method. The raw metal powder is made of an aluminum alloy. The aluminum alloy contains Fe and Mn. The weight % of Fe exceeds 1 and is 10 or less. The weight % of Mn is 1.5 or less. The aluminum alloy additive manufacturing product contains an intermetallic compound that contains two or more of Al, Mn, and Fe.

In the aluminum alloy additive manufacturing products according to the second and the third aspects of the present invention, the aluminum alloy may further contain any one or more elements of 4 to 30 weight % Si, 0.5 to 5.0 weight % Mg, 0.5 to 5 weight % Cu, and 0.5 to 3 weight % Ni.

In the aluminum alloy additive manufacturing product according to the second aspect of the present invention, the aluminum alloy may contain 8 to 20 weight % Si and 0.5 to 2.0 weight % Mg, and a total weight of Fe, Mn, and Cr may be 1.8 to 5.0 weight %.

In the aluminum alloy additive manufacturing product according to the third aspect of the present invention, the aluminum alloy may contain 8 to 20 weight % Si and 0.5 to 2.0 weight % Mg, and a total weight of Fe, Mn, and Cr is 1.0 to 5.0 weight %.

In the aluminum alloy additive manufacturing products according to first, the second, and the third aspect of the present invention, the aluminum alloy may further contain any one or more elements of 0.2 to 3 weight % Ti, 0.2 to 5 weight % Zr, 0.2 to 5 weight % Sc, 0.2 to 10 weight % Li, and 0.2 to 5 weight % V.

A fourth aspect of the present invention provides a method for manufacturing an aluminum alloy additive manufacturing product that includes a step of molding a raw metal by an additive manufacturing method, the raw metal being made of an aluminum alloy, the aluminum alloy containing Fe and one or more of Mn and Cr, the Fe being an inevitable impurity of 0.3 weight % or less, and the one or more of Mn and Cr having a total weight of 0.3 to 10 weight %.

Alternatively, the fourth aspect of the present invention provides a method for manufacturing an aluminum alloy additive manufacturing product that includes a step of molding a raw metal powder by an additive manufacturing method, the raw metal powder being made of an aluminum alloy, the aluminum alloy containing Fe and Mn, the Fe being an inevitable impurity of 0.3 weight % or less, and the Mn being 0.3 to 10 weight %.

In the method for manufacturing the aluminum alloy additive manufacturing product according to the fourth aspect of the present invention, the additive manufacturing of the raw metal may be performed with a measurement temperature of a lower plate controlled to 150 to 250° C., and the raw metal may be placed on the lower substrate plate.

The aluminum alloy may further contain any one or more elements of 1 to 20 weight % Si, 0.2 to 7.0 weight % Mg, 0.5 to 5 weight % Cu, and 0.5 to 3 weight % Ni.

In the aluminum alloy additive manufacturing product according to the fourth aspect of the present invention, the aluminum alloy may contain 4 to 15 weight % Si and 0.2 to 1.0 weight % Mg, and the total weight of Mn and Cr may be 0.3 to 2.5 weight %.

In the aluminum alloy additive manufacturing product according to the fourth aspect of the present invention, the aluminum alloy may contain 8 to 20 weight % Si, 0.5 to 2.0 weight % Mg, 0.5 to 5 weight % Cu, and 0.5 to 3 weight % Ni, and the total weight of Mn and Cr may be 1.5 to 5.0 weight %.

In the aluminum alloy additive manufacturing product according to the fourth aspect of the present invention, the aluminum alloy may contain 1 to 3 weight % Si and 4.0 to 6.0 weight % Mg, and the total weight of Mn and Cr may be 0.5 to 2.5 weight %.

A fifth aspect of the present invention provides a method for manufacturing an aluminum alloy additive manufacturing product that includes a step of molding a raw metal by an additive manufacturing method, the raw metal being made of an aluminum alloy, the aluminum alloy containing Fe and one or more of Mn and Cr, the weight % of Fe exceeding 0.3 and being 2 or less, and the one or more of Mn and Cr having a total weight of 1.5 to 10 weight %.

Alternatively, the fifth aspect of the present invention provides a method for manufacturing an aluminum alloy additive manufacturing product that includes a step of molding a raw metal powder by an additive manufacturing method, the raw metal powder being made of an aluminum alloy, the aluminum alloy containing Fe and Mn, the weight % of Fe exceeding 0.3 and being 2 or less, and the Mn exceeding 1.5 weight % and being 10 weight % or less.

A sixth aspect of the present invention provides a method for manufacturing an aluminum alloy additive manufacturing product that includes a step of molding a raw metal by an additive manufacturing method, the raw metal being made of an aluminum alloy, the aluminum alloy containing Fe and one or more of Mn and Cr, the weight % of Fe exceeding 1 and being 10 or less, and the one or more of Mn and Cr having a total weight of 1.5 weight % or less.

Alternatively, the sixth aspect of the present invention provides a method for manufacturing an aluminum alloy additive manufacturing product that includes a step of molding a raw metal powder by an additive manufacturing method, the raw metal powder being made of an aluminum alloy, the aluminum alloy containing Fe and Mn, the weight % of Fe exceeding 1 and being 10 or less, and the weight % of Mn being 1.5 or less.

In the methods for manufacturing the aluminum alloy additive manufacturing product according to the fifth and the sixth aspects of the present invention, the additive manufacturing of the raw metal may be performed with a measurement temperature of a lower plate controlled to 150 to 300° C., and the raw metal may be placed on the lower plate.

A seventh aspect of the present invention provides a method for manufacturing an aluminum alloy additive manufacturing product that includes a step of molding a raw metal by an additive manufacturing method, the raw metal being made of an aluminum alloy containing Fe, Mn, and Cr, the Fe, Mn, and Cr having a total weight of 2 to 10 weight %, and a measurement temperature of a lower plate during the additive manufacturing is controlled to exceeding 250° C. and 450° C. or less.

Alternatively, the seventh aspect of the present invention provides a method for manufacturing an aluminum alloy additive manufacturing product that includes a step of molding a raw metal powder by an additive manufacturing method, the raw metal powder being made of an aluminum alloy containing Fe and Mn, the Fe and Mn having a total weight of 2 to 10 weight %, and a measurement temperature of a lower plate during the additive manufacturing is controlled to exceeding 250° C. and 450° C. or less.

In the methods for manufacturing the aluminum alloy additive manufacturing product according to the fifth to the seventh aspects of the present invention, the aluminum alloy may further contain any one or more elements of 4 to 30 weight % Si, 0.5 to 5.0 weight % Mg, 0.5 to 5 weight % Cu, and 0.5 to 3 weight % Ni.

In the methods for manufacturing the aluminum alloy additive manufacturing product according to the fourth to the seventh aspects of the present invention, the aluminum alloy may further contain anyone or more elements of 0.2 to 3 weight % Ti, 0.2 to 5 weight % Zr, 0.2 to 5 weight % Sc, 0.2 to 10 weight % Li, and 0.2 to 5 weight % V.

An eighth aspect of the present invention is the additive manufacturing product according to the first aspect of the present invention, and a tensile strength at room temperature exceeds 320 MPa.

A ninth aspect of the present invention is the additive manufacturing product according to the second and the third aspects of the present invention, and a tensile strength at 300° C. exceeds 100 MPa.

Advantageous Effects of Invention

The present invention provides an aluminum alloy laminated molded product having a high strength where a cracking is not generated inside and outside the additive manufacturing product, and in addition, a deformation is small, and a method for manufacturing the same.

DETAILED DESCRIPTION

Figure 1:
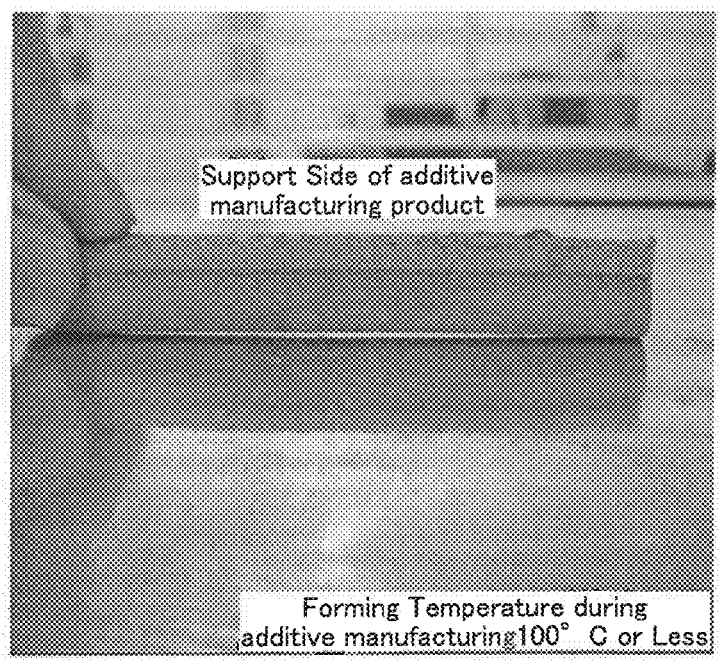
FIG. 1 is a photograph illustrating a deformation of a conventional additive manufacturing product.
Figure 2:
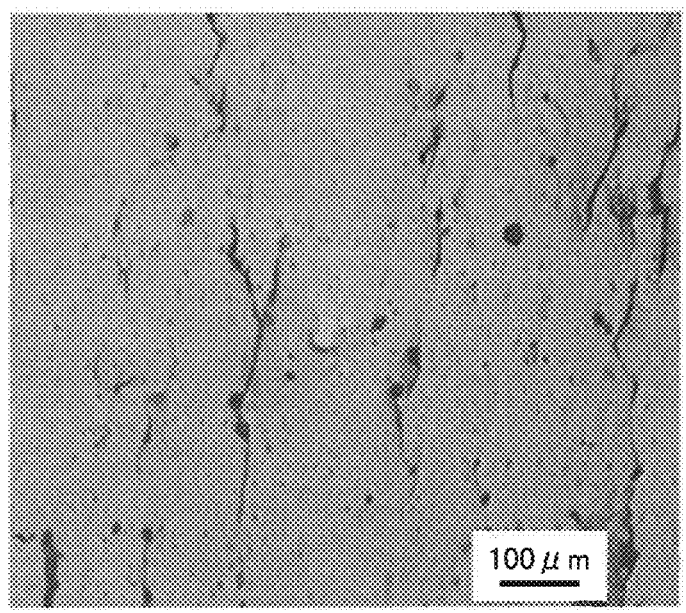
FIG. 2 is a photograph illustrating an intergranular cracking of the conventional additive manufacturing product.
Figure 3:
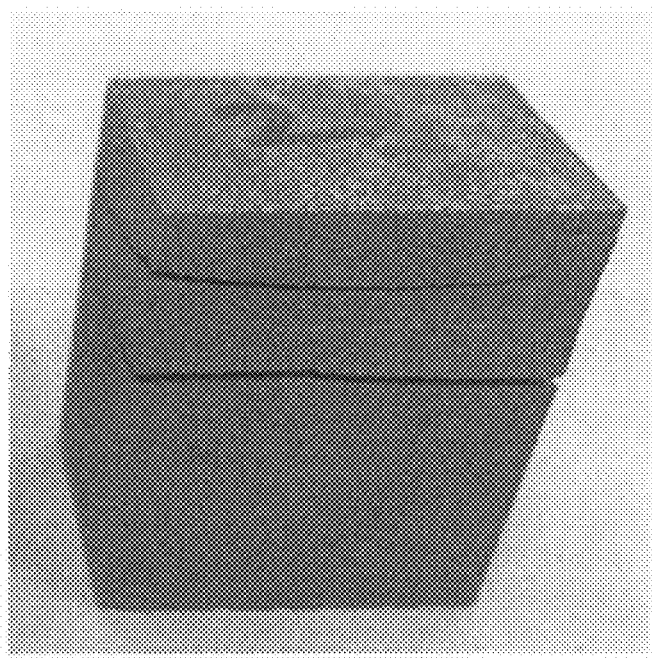
FIG. 3 is a photograph illustrating a cracking of the conventional additive manufacturing product.

The following describes various embodiments of the present invention in detail. An aluminum alloy additive manufacturing product of the present invention is a molded body formed by molding by an additive manufacturing method where an alloyed material is laminated. The additive manufacturing method is a method for forming a final product without a mold by depositing a raw metal, and for example, a powder bed fusion (powder bed fusion) method and a deposit method (direct energy deposition) are included. The aluminum alloy additive manufacturing product of the present invention includes both the additive manufacturing product by the powder bed fusion method and the additive manufacturing product by the deposit method.

The powder bed fusion method is a method where a raw metal powder is spread all over layer by layer, irradiated with a laser beam, an electron beam, or the like, and laminated while only a specific part is melted and solidified.

The deposit method is a method where a raw metal powder is directly injected to a part desired to be additive manufactured, and additive manufactured while this metal powder is melted. The deposit method also includes a method (wire feed method) where an alloy wire made of a raw metal is used instead of the powder, and is deposited while this alloy wire is irradiated with a laser beam, an electron beam, or the like to be melted.

The aluminum alloy additive manufacturing product according to a first embodiment of the present invention is formed by molding a raw metal by an additive manufacturing method. The raw metal is made of an aluminum alloy. The aluminum alloy contains Fe and one or more of Mn and Cr. The Fe is an inevitable impurity of 0.3 weight % or less. The one or more of Mn and Cr have a total weight of 0.3 to 10 weight %. The aluminum alloy additive manufacturing product contains any one or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

Mn and Cr are elements effective for enhancing a tensile strength in a low-temperature atmosphere (room-temperature strength) and a tensile strength in a high-temperature atmosphere (high-temperature strength). Since a total content of Mn and Cr exceeding 10 weight % causes an increased reduction in ductility, the total content of Mn and Cr is set to 10 weight % or less. However, when the ductility is especially increased, the total content of Mn and Cr is preferably set to 5 weight % or less, and more preferably set to 2.5 weight % or less.

Because of the low Fe content of 0.3 weight % or less, Mn and Cr having a total weight of 0.3 to 10 weight % is reduced in amount to generate an intermetallic compound with Fe of high content during an additive manufacturing step. A part of Mn and Cr is once supersaturatedly dissolved during metal additive manufacturing, and then, most of them form a compound with aluminum due to a heat during additive manufacturing and contribute to precipitation hardening. Another part of Mn and Cr forms, for example, a fine crystallized product with aluminum due to melting and solidification during additive manufacturing, and contributes to dispersion strengthening.

An effect of the precipitate containing the compound of Al with one or more of Mn and Cr exhibits, in a case of the Mn content of 0.3 to 1.5 weight %, a high room-temperature strength while reducing the distortion due to the additive manufacturing when a measurement temperature (hereinafter referred to as a holding temperature during additive manufacturing) of a lower substrate plate during additive manufacturing is in a range of 150° C. to 250° C. For the high room-temperature strength while further reducing the distortion, 180° C. to 250° C. is further preferred.

Specifically, in the first embodiment, the additive manufacturing product laminated under the holding temperature during additive manufacturing of 150 to 250° C. is preferred to have the tensile strength at room temperature, which is evaluated without a heat treatment (T6 processing) after the additive manufacturing step, exceeding 320 MPa, exceeding 330 MPa is more preferred, and exceeding 350 MPa is further preferred.

Meanwhile, in a case where the total content of Mn and Cr exceeds 1.5 weight %, especially, in a case of exceeding 3 weight %, the high hardness is exhibited because the material immediately after additive manufacturing does not largely soften due to the overaging even under the holding temperature during additive manufacturing in the range of 150° C. to 400° C. That is, not only at the room-temperature strength but also at the high-temperature strength of 300° C., the effect of Mn and Cr is maintained. This can be described by that the precipitation hardening by Mn and Cr is maintained up to 400° C. To reduce the distortion and the hot cracking, the holding temperature during additive manufacturing of 180° C. to 400° C. is more preferred, and 200° C. to 400° C. is further preferred.

In the above-described embodiment, the aluminum alloy may further contain any one or more elements of 1 to 20 weight % Si, 0.2 to 7.0 weight % Mg, 0.5 to 5 weight % Cu, and 0.5 to 3 weight % Ni.

In the first embodiment, the aluminum alloy may contain 4 to 15 weight % Si and 0.2 to 1.0 weight % Mg, and may contain Mn and Cr having a total weight limited to 0.3 to 2.5%.

In the first embodiment the aluminum alloy may contain 8 to 20 weight % Si, 0.5 to 2.0 weight % Mg, 0.5 to 5 weight % Cu, and 0.5 to 3 weight % Ni, and the total weight of Mn and Cr may be 1.5 to 5.0 weight %.

In the first embodiment, the aluminum alloy may contain 1 to 3 weight % Si and 4.0 to 6.0 weight % Mg, and the total weight of Mn and Cr may be 0.5 to 2.5 weight %.

The aluminum alloy additive manufacturing product according to a second embodiment of the present invention is formed by molding a raw metal by an additive manufacturing method. The raw metal is made of an aluminum alloy. The aluminum alloy contains Fe and one or more of Mn and Cr. The weight % of Fe exceeds 0.3 and is 2 or less. The one or more of Mn and Cr have a total weight of 1.5 to 10 weight %. The aluminum alloy additive manufacturing product contains anyone or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

The aluminum alloy additive manufacturing product according to a third embodiment of the present invention is formed by molding a raw metal by an additive manufacturing method. The raw metal is made of an aluminum alloy. The aluminum alloy contains Fe and one or more of Mn and Cr. The weight % of Fe exceeds 1 and is 10 or less. The one or more of Mn and Cr have a total weight of 1.5 weight % or less. The aluminum alloy additive manufacturing product contains anyone or more of an intermetallic compound and an aluminum alloy solid solution. The intermetallic compound contains two or more of Al, Mn, Fe, and Cr. One or more elements of Mn, Fe, and Cr are dissolved in the aluminum alloy solid solution.

In these embodiments, by the laminate molding of the raw metal made of the aluminum alloy that has the Fe content exceeding 0.3 weight % and a predetermined combination of the Fe content, the Mn content, and the Cr content, a Fe—Al compound, a Cr—Al compound, a Fe—Mn compound, a Fe—Cr compound, and the like are formed a lot, and thus, a high high-temperature strength is obtained at a high temperature around 300° C.

Specifically, in the second and the third embodiments, the additive manufacturing product laminated under the holding temperature during additive manufacturing of 150 to 300° C. is preferred to have the tensile strength at a high temperature (300° C.), which is evaluated without a heat treatment (T6 processing) after the additive manufacturing step, exceeding 100 MPa, exceeding 120 MPa is more preferred, and exceeding 140 MPa is further preferred.

In the second and the third embodiments, the additive manufacturing product laminated under the holding temperature during additive manufacturing of 150 to 300° C. is preferred to have the tensile strength at a high temperature (300° C.), which is evaluated after a heat treatment (T6 processing), exceeding 80 MPa, exceeding 85 MPa is more preferred, and exceeding 90 MPa is further preferred.

However, too high contents of Fe, Cr, and Mn easily cause the hot cracking of the additive manufacturing product. In addition, the compounds are coarsened. Therefore, while the contents of Fe, Mn, and Cr are limited as described above, the holding temperature during additive manufacturing is preferred to be chosen to reduce the distortion and the hot cracking in both cases of obtaining the room-temperature high-strength additive manufacturing product and obtaining the high-strength at high-temperature additive manufacturing product as described below.

In the second and the third embodiments of the present invention, the aluminum alloy may further contain any one or more elements of 4 to 30 weight % Si, 0.5 to 5.0 weight % Mg, 0.5 to 5 weight % Cu, and 0.5 to 3 weight % Ni.

In the second embodiment of the present invention, the aluminum alloy may contain 8 to 20 weight % Si and 0.5 to 2.0 weight % Mg, and the total weight of Fe, Mn, and Cr may be 1.8 to 5.0 weight %.

In the third embodiment of the present invention, the aluminum alloy may contain 8 to 20 weight % Si and 0.5 to 2.0 weight % Mg, and the total weight of Fe, Mn, and Cr may be 1.0 to 5.0 weight %.

In the first, the second, and the third embodiments of the present invention, the aluminum alloy may further contain any one or more elements of 0.2 to 3 weight % Ti, 0.2 to 5 weight % Zr, 0.2 to 5 weight % Sc, 0.2 to 10 weight % Li, and 0.2 to 5 weight % V.

Titanium (Ti), zirconium (Zr), vanadium (V), scandium (Sc), and lithium (Li) have a characteristic to form a non-equilibrium microstructure with an aluminum having an $L1_2$ ordered structure. By adding these elements, the room-temperature tensile strength and the high-temperature tensile strength can be increased compared with a case of no addition. It is preferred not to have values of the additive amounts of these elements exceeding the above-described range because of the difficulty in manufacturing and the reduction in ductility.

The following describes various embodiments of choosing the holding temperature during additive manufacturing and the method for manufacturing the additive manufacturing product.

[Case of Obtaining High-Strength at Room-Temperature Additive Manufacturing Product]

For example, in the additive manufacturing product having a complex shape, an Al—Si—Mg based alloy and an Al—Si—Mg—Cu based alloy are less likely to be softened when the holding temperature during additive manufacturing is less than 150° C. even if a heat affected time is long, and exhibit the high tensile strength in a state (as built) before performing the heat treatment (T6 processing) after the additive manufacturing, while the additive manufacturing product is easily distorted.

Meanwhile, when the holding temperature during additive manufacturing exceeds 150° C., especially exceeds 180° C., the distortion of the additive manufacturing product is small, but the additive manufacturing product is easily softened due to the overaging. Furthermore, when the holding temperature during additive manufacturing exceeds 200° C., the softening progresses due to the reduced amount of Si considered to be supersaturatedly dissolved in Al and the coarsened Mg—Si precipitate. Therefore, a manufacturing method for obtaining a high-strength at a room-temperature additive manufacturing product that is not softened even at a high holding temperature during additive manufacturing exceeding 180° C. is required. Obviously, since the high-strength is exhibited while the additive manufacturing product remains as it is, the heat treatment, such as a solution treatment at 500° C. or more, and the subsequent quenching/tempering is not necessary. The additive manufacturing product performed with the heat treatment has a low tensile strength compared with the additive manufacturing product (as built) before performing the heat treatment (T6 processing).

<Case of Forming any One or More of: Intermetallic Compound where Weight % of Fe is 0.3 or Less, Total Content of Mn and Cr is 0.3 to 10 Weight %, and Two or More of Al, Mn, Fe, and Cr are Contained; and Aluminum Alloy Solid Solution where Weight % of Fe is 0.3 or Less, Total Content of Mn and Cr is 0.3 to 10 Weight %, and One or More Elements of Mn, Fe, and Cr are Dissolved>

When the aluminum alloy contains any one or more of Mn and Cr, the high tensile strength is exhibited even at the holding temperature during additive manufacturing exceeding 180° C. Because, the additive manufacturing product once melted and solidified during additive manufacturing is less likely to be overaged even at the holding temperature during additive manufacturing of 180 to 250° C. due to precipitation of the Mn/Cr—Al compounds due to the holding temperature during additive manufacturing, thus the additive manufacturing product is not softened.

Therefore, as described above, at the holding temperature during additive manufacturing of 150 to 250° C., the additive manufacturing product has a reduced distortion and the high strength at room-temperature is exhibited.

However, when the additive manufacturing time is long (for example, in a case of exceeding one day), a lower portion of an additive manufacturing product close to the substrate plate is especially affected by heat, the averaging progresses, and the lower portion of the additive manufacturing product is possibly softened. For reducing this, it is effective to set the temperature during additive manufacturing lower in a range of 150° C. to 250° C. However, conversely, the distortion easily occurs inside and outside the additive manufacturing product.

Therefore, to provide both strength and low distortion at the same time, the following countermeasures can be taken.

1) The additive manufacturing product as built is heated at 250° C. or less, preferably 200° C. or less, for a predetermined time.

2) The temperature on the substrate plate side is changed to be increased in stages. For example, in accordance with the increase of the additive manufacturing height, the temperature is changed from less than 100° C. to a range of 100° C. to 250° C.

[Case of Obtaining High-Strength at High-Temperature Additive Manufacturing Product]

Fe, Cr, and Mn each contribute to improvement of the tensile strength at high temperature exceeding 200° C. Corresponding to the contents of Fe, Cr, and Mn, the holding temperatures during additive manufacturing are employed as described below. To the additive manufacturing product, the heat treatment, such as quenching/tempering, after the solution treatment at 500° C. or more can be performed, but similarly to the case of the high-strength at room-temperature additive manufacturing product, from a perspective of obtaining the extremely satisfactory tensile property, the use without the heat treatment is preferred.

(1) Holding Temperature During Additive Manufacturing at 150 to 250° C. is Chosen as Countermeasure to Distortion and Hot Cracking of Additive Manufacturing Product <Case of Forming any One or More of: Intermetallic Compound where Weight % of Fe Exceeds 1 and is 10 or Less, One or More of Mn and Cr Having Total Weight of 1.5 Weight % or Less are Contained, and Two or More of Al, Mn, Fe, and Cr are Contained; and Aluminum Alloy Solid Solution where Weight % of Fe Exceeds 1 and is 10 or Less, One or More of Mn and Cr Having Total Weight of 1.5 Weight % or Less are Contained, and One or More Elements of Mn, Fe, and Cr are Dissolved>

By increasing the Fe content, the high-temperature strength can be increased. However, when the Fe content exceeds 10 weight %, a large thermal stress occurs inside the additive manufacturing product to easily cause the cracking of the additive manufacturing product (including the support). When the Fe content exceeds 10 weight %, the compound with Al is coarsened, especially, an Al—Fe compound is formed in a coarse needle shape, thus causing the ductility reduction. Meanwhile, when the Fe content is less than 1 weight %, the improvement of the high-temperature strength is small. In view of this, the Fe content is set to exceeding 1 weight % and 10 weight % or less. Note that, to further increase the high-temperature strength, 2 weight % or more is preferred. In the case of having the high-temperature strength, and moreover, especially increasing the ductility, 2 to 7 weight % is preferred, and 2 to 5 weight % is more preferred. 2 to 5 weight % is appropriate for reducing the hot cracking of the additive manufacturing product.

To increase the ductility while keeping the high-temperature strength, it is effective to have the Fe content limited to the range of 1 to 7 weight % and the Mn content of 0.1 weight % or more because the shape of the Fe compound can be changed from the needle shape to a lump shape. However, the Mn content exceeding 1.5 weight % tends to promote the occurrence of the cracking rather than the case of containing Fe alone. In view of this, the Mn content is preferably 0.1 to 1.5 weight %, and more preferably in a range of 0.1 to 0.5 weight %.

<Case of Forming any One or More of: Intermetallic Compound where Weight % of Fe Exceeds 0.3 and is 2 or Less, One or More of Mn and Cr Having Total Weight of 1.5 to 10 Weight % are Contained, and Two or More of Al, Mn, Fe, and Cr are Contained; and Aluminum Alloy Solid Solution where Weight % of Fe Exceeds 0.3 and is 2 or Less, One or More of Mn and Cr Having Total Weight of 1.5 to 10 Weight % are Contained, and One or More Elements of Mn, Fe, and Cr are Dissolved>

By adding Fe, a Mn—Fe compound is generated to ensure increasing the high-temperature strength of the additive manufacturing product. However, when the Fe content is 0.3 weight % or less, generation of a Fe—Mn intermetallic compound is a little, thus the high-temperature strength is not sufficiently obtained. Meanwhile, when the Fe content exceeds 2 weight %, the high-temperature strength increases while the hot cracking easily occurs. In view of this, the Fe content is set to exceeding 0.3 weight % and 2 weight % or less.

Meanwhile, the total content of Mn and Cr is set to 1.5 weight % or more to increase the high-temperature strength of the additive manufacturing product. However, since exceeding 10 weight % reduces the ductility, the total content of Mn and Cr is set to 1.5 to 10 weight %. To obtain the additive manufacturing product having the high-temperature strength, and moreover, the especially high ductility, the total content of Mn and Cr is preferably set to 1.5 to 5 weight %.

<Case of Forming any One or More of: Intermetallic Compound where Weight % of Fe is 0.3 or Less, Total Weight of Mn and Cr is 0.3 to 10 Weight %, and Two or More of Al, Mn, Fe, and Cr are Contained; and Aluminum Alloy Solid Solution where Weight % of Fe is 0.3 or Less, Total Weight of Mn and Cr is 0.3 to 10 Weight %, and One or More Elements of Mn, Fe, and Cr are Dissolved>

With the Fe content of 0.3 weight % or less, a Mn—Al compound and a Cr—Al compound can be generated to increase the high-temperature strength of the additive manufacturing product. This is considered because a Mn—Al precipitate and a Cr—Al precipitate do not change in shape up to 400° C.

However, when the total content of Mn and Cr is less than 1.5 weight %, the sufficient high-temperature strength is not obtained. Meanwhile, since the total content of Mn and Cr exceeding 10 weight % reduces the ductility, 1.5 to 10 weight % is preferred. To obtain the additive manufacturing product having the high-temperature strength, and moreover, the especially high ductility, the total content of Mn and Cr is more preferably set to 1.5 to 5 weight %.

(2) Holding Temperature During Additive Manufacturing Exceeding 250° C. and 450° C. or Less is Chosen as Countermeasure to Distortion and Hot Cracking of Additive Manufacturing Product Choosing the holding temperature during additive manufacturing exceeding 250° C. and 450° C. or less is another means to achieve the satisfactory tensile strength while achieving the high ductility and the hot cracking reduction. As such a manufacturing method, an electron beam additive manufacturing method satisfies this condition.

By setting the holding temperature during additive manufacturing to the range exceeding 250° C. and 450° C. or less, the hot cracking generated during the additive manufacturing at the holding temperature during additive manufacturing of 150 to 250° C. is reduced. This is considered because the decreased difference between the temperature immediately after melting and the temperature before melting decreases the thermal stress. However, exceeding 450° C. as the upper limit in the range of the holding temperature during additive manufacturing causes a eutectic Si and the intermetallic compound to become too large in size, thus the tensile strength is reduced. In the case of setting the holding temperature during additive manufacturing to 250° C. or less, the additive manufacturing time during molding needs to be lengthened to reduce heat storage during additive manufacturing, and this is not appropriate in terms of manufacturing efficiency.

However, while the tensile strength is improved by any of containing Mn alone, containing Fe alone, and containing Mn or Cr and Fe, the size of the intermetallic compound increases because of the large heat amount to be added. Since the shape of the intermetallic compound is, for example, a coarse needle shape or a coarse rod shape having a size exceeding 100 μm in containing Fe alone, and a coarse trepan shape in a combined addition of Fe and Mn, a sum content of Fe, Cr, and Mn needs to be 2 to 10 weight %.

In the present invention, the size of the intermetallic compound is preferred to be less than 200 μm in the longest diameter of an observation surface.

However, in the case of especially increasing the ductility, the total weight of Fe, Cr, and Mn is preferably 2 to 7 weight %, and more preferably 2 to 5 weight %. To increase the ductility while keeping the high-strength of the additive manufacturing product, in the Fe content range of 2 to 5 weight %, the Mn content is preferably limited to the range of 0.1 to 1.0 weight %, more preferably 0.1 to 0.5 weight %. Thus reduced Mn content is effective to change the shape of an iron compound to be generated from the needle shape to the fine lump shape.

The aluminum alloy, which is used in the above-described embodiments where the predetermined holding temperature during additive manufacturing is employed, may further contain any one or more elements of 4 to 30 weight % Si, 0.5 to 5.0 weight % Mg, 0.5 to 5 weight % Cu, and 0.5 to 3 weight % Ni.

Among these elements, Si contributes to the improvement of the tensile strength of the additive manufacturing product. Si provides two types of effects, a dispersion hardening by the eutectic Si and a solid-solution hardening as a result of dissolution of Si in an aluminum matrix.

While Si is added for these effects, in the case where the holding temperature during additive manufacturing is 250° C. or less, since exceeding 20 weight % increases the ductility reduction, the upper limit is preferably 20 weight % to increase the room-temperature strength. Since the intergranular cracking easily occurs at less than 4 weight %, the lower limit is preferably 4 weight %. Accordingly, to increase the room-temperature strength, the Si content is preferably 4 to 20 weight %.

Meanwhile, also to increase the high-temperature strength, adding Si is effective. Si also has an effect to improve wear resistance. However, since an excessive content makes the additive manufacturing product brittle, 4 to 30 weight % is preferred.

In the case of obtaining the high-temperature high-strength additive manufacturing product, the range of Si content is identical at both holding temperatures during additive manufacturing of 150 to 250° C., and exceeding 250° C. and 450° C. or less.

Cu is added as necessary to improve a room-temperature tensile property, a cutting property, and a high-temperature tensile property. In a conventional casting alloy, compounds estimated as a θ phase (Cu—Al) and a Q compound (Al—Cu—Mg—Si) are formed on a eutectic portion. However, in a metal additive manufacturing method, most Cu is dissolved in the aluminum matrix because Cu has a solidification rate about $10^3$° C./s. Therefore, in addition to an action for solid-solution strengthening, Cu of a predetermined proportion contributes to the room-temperature strength as precipitates with the heat at additive manufacturing.

When the high-temperature strength is required, the T6 processing (solution treatment, water quenching, aging) is performed, and for example, dimensional stabilization processing can be performed at a temperature equivalent to 300° C. This causes softening more than the as built body immediately after the additive manufacturing, but even then, the effect of improving the high-temperature strength is provided. Therefore, the additive amount of Cu is set to 0.5 weight % or more to cause the effect to be expressed, and its upper limit is preferably 5 weight % or less to ensure the ductility and the corrosion resistance.

In the conventional casting alloy, less than about 0.5 weight % Mg and Si generate an Mg—Si compound, and Mg is precipitated and hardened thereby to contribute to the improvement of the room-temperature strength. It has been known that 1 to 5 weight % Mg improves the high-temperature strength at 300° C.

However, in the metal additive manufacturing method, most Mg is dissolved in the aluminum matrix because Mg has a solidification rate about $10^{3}$° C./s, and a part of it is precipitated due to the temperature during additive manufacturing. Performing the T6 processing (solution treatment, water quenching, aging) and the temperature about 300° C. cause softening, but even then, the effect of improving the high-temperature strength is provided. Therefore, the additive amount of Mg is preferably 0.5 weight % or more to cause the effect to be expressed, and preferably 5 weight % or less to ensure the ductility.

In the conventional casting alloy, Ni is added to increase the high-temperature strength. In contrast, in the metal additive manufacturing method, a Ni—Al compound generated with Al is extremely fine because of a solidification rate about $10^{3}$° C./s. Therefore, the additive amount of Ni is preferably 0.3 to 3 weight %.

While the composition of the raw aluminum alloy of the additive manufacturing product according to the embodiment has been described above, the additive manufacturing product can be obtained by forming the powder of this raw aluminum alloy by the metal additive manufacturing method.

In order to obtain an additive manufacturing product having desired material characteristics, it is necessary to optimize the alloy composition of the metal powder as much as possible in accordance with the intended use of the product. For that purpose, it is important to compare the properties of additive manufacturing products manufactured from various metal powders. However, it is an efficient and a low cost method that narrowing down candidates of alloys of the additive manufacturing product by evaluating the properties of rapidly solidified bodies (about 1000° C./s or more) manufactured by conventional casting methods without using metal powders as a starting materials. In addition, if the cooling rate during solidification is equivalent to that of the additive manufacturing product, the excellent characteristics of the additive manufacturing product can be obtained even in a rapidly solidified body manufactured by the conventional casting method, for example, a twin roll method or a continuous casting method. It can be reproduced.

The following describes the additive manufacturing method applicable to the present invention.

Generally, the metal additive manufacturing method is performed by the following steps.

(1) A metal powder layer having a constant thickness is spread all over by one layer.

(2) Apart to be solidified is partially irradiated with an electron beam or a laser beam to heat the powder layer, and the powder is instantaneously melted and instantaneously solidified. In this case, the electron beam or the laser beam performs scanning based on 3D data or slice data.

(3) A manufacturing table is moved down, and the metal powder layer is further spread all over by one layer.

(4) By repeating the above-described steps, the metal powder is additive manufactured to obtain the additive manufacturing product in a final shape. Subsequently, unsolidified powder is removed and the additive manufacturing product is taken out.

The metal additive manufacturing method applicable to the manufacture of the additive manufacturing product according to the embodiment includes an electron beam additive manufacturing method performed using an electron beam laminator and a laser additive manufacturing method performed using a laser additive manufacturing apparatus.

As the additive manufacturing method according to the embodiment, a deposit method can be employed. The deposit method includes a method where a metal powder is injected to a desired portion and deposited while melting this portion, and a method where an alloy wire is deposited while being melted.

The additive manufacturing product designed using the additive manufacturing method as described above can be not only directly used as a final product after molding, but also performed with the following treatment and processing.

(1) An aging treatment is performed after additive manufacturing. Performing the aging treatment ensures precipitating elements, dissolved by rapid solidification, as compounds to be strengthened, thus the improvement of the strength of the additive manufacturing product is ensured. In this case, by a combined addition of types of alloys, for example, uniform dispersion of precipitates can be promoted. The combined addition of Zr and Cr is an example.

(2) Press is performed after additive manufacturing. Performing the processing leads to refinement of crystal, thus the improvement of the strength of the additive manufacturing product is ensured.

(3) The aging treatment and the press are performed after additive manufacturing. Alternatively, the processing and the aging treatment are performed after additive manufacturing. With any of these processes, a synergistic effect by refinement of crystal grains and formation of fine precipitates can be provided.

WORKING EXAMPLES

The following describes the working examples of the present invention in comparison with comparative examples.

Working Examples 1 to 17, Comparative Examples 1 to 5

Using Al alloy powders (average particle diameter: 35 μm) having compositions indicated in Table 1 below, 21 types of additive manufacturing products (Working Examples 1 to 17, Comparative Examples 1 to 4) were formed in 20 mm×30 mm and height 50 mm by the laser additive manufacturing method, and specimens having a gauge length of 5 mm, a parallel portion width of 2 mm, and a whole length of 20 mm were cut out in a height direction of the additive manufacturing product. In Comparative Example 5, the molded body was formed by a high pressure casting method. The material by the high pressure casting method in Comparative Example 5 was evaluated with a specimen having a parallel portion diameter of 6.3 mm and the gauge length of 30 mm cut out from a casting material of diameter 10 mm×length 100 mm. The alloys equivalent to AC8A in Comparative Example 8 and Working Examples 13 and 14 were the additive manufacturing products (as built materials) on which the T6 processing was not performed, and evaluated with the specimens having the gauge length of 12 mm, the parallel portion width of 4 mm, the whole length of 40 mm, and a thickness of 1.5 mm.

The holding temperature during additive manufacturing in the case of not heated during additive manufacturing was 70° C., the holding temperatures during additive manufacturing in the case of preheated during additive manufacturing were 200° C. (Working Examples 1, 2, 4 to 9, and 12 to 17, Comparative Examples 1 to 4), 250° C. (Working Example 3), 160° C. (Working Example 10), or 180° C. (Working Example 11).

For these molded bodies, the room-temperature tensile strengths (MPa) and elongations (%) were measured, and the distortions of the molded bodies were observed. Table 1 below indicates the results.

From Table 1 below, it is seen that Comparative Example 1 with a low Si content of 3 weight % has no problem on the surface of the additive manufacturing product, but the intergranular cracking is recognized a lot in the metal structure inside the additive manufacturing product, and the tensile strength is low at 150 MPa. For an Al-10% Si—0.37% Mg alloy without Mn as Comparative Example 2, a value of the tensile strength exceeds 400 MPa when the holding temperature during additive manufacturing is 70° C., while a low value of 290 MPa was exhibited at 200° C.

Comparative Example 3 is a case where the Si content is high at 25 weight %, there is no problem on the surface of the additive manufacturing product, and the tensile strength was high at 320 MPa while the elongation exhibited low values of 2% and 3%. While the distortion was slightly generated at the additive manufacturing temperature of 70° C., neither distortion nor hot cracking was recognized at the holding temperature during additive manufacturing of 200° C.

In Comparative Example 4, since the total weight of Mn and Cr exceeds 10 weight %, the tensile strength was high while the elongation was low.

In Comparative Example 5, for improving the tensile strength and reducing the casting crack of the Al—Mg based alloy, Si was added. For improving the tensile strength, Mn was added. However, the tensile strength is 300 MPa or less.

Meanwhile, in any of Working Examples 1 to 17, while the holding temperatures during additive manufacturing were different at 200° C., 160° C., 180° C., or 250° C., and alloy compositions were different, the tensile strength exhibited high values of 330 MPa to 480 MPa. Especially, when Mn was contained by 1.5 weight % or more (Working Examples 4, 5, and 6), the values of the tensile strength were 450 MPa or more. While Working Example 17 has a low Si content compared with Working Example 2, the tensile strength and the elongation were higher than those of Working Example 2. The tensile strength of Working Example 17 was equal to or higher than that of Working Example 4, and the elongation exhibited the value higher than that of Working Example 2 by 2%. Working Example 17 exhibited a high proof stress at 310 MPa while it is not indicated in Table 1, and this value was a value higher than that of Working Example 2 by 90 MPa. In this phenomenon, the tensile strength and the elongation are considered to have been improved by (1) that the decreased Si content reduces an amount of the reticulated eutectic Si to restrain a starting point and progress of the hot cracking, and combined with this, (2) that fine intermetallic compounds (crystallized product, precipitate) due to Mn addition and solid solutions into which Mn dissolves are formed.

The Si content, with which this effect is provided for the additive manufacturing product containing one or more of Mn and Cr, is preferably 4 to 8 weight %. The Si content of less than 4 weight % easily causes the hot cracking inside the additive manufacturing product. The Si content exceeding 8 weight % has difficulty in increasing both the tensile strength and the elongation compared with the Si content of 8 weight % or less.

For any of the Cr-containing alloys of Working Examples 10 to 13, similarly to the case of containing Mn alone, the high values of 400 MPa or more were exhibited. In Working Example 14, Zr was added to Working Example 13, and in Working Example 15, Ti was added to Working Example 2. Thus, the tensile strength was improved without decreasing the elongation.

Working Example 16 exhibited the high tensile strength and the high elongation, which are different from those of Comparative Example 5. This is considered because, in addition to that a eutectic $Mg_2Si$ phase is fine due to the rapid solidification, Mn that forms an Al—Mn compound in a high pressure casting material is dissolved in aluminum by a large amount to be precipitated to be strengthened, and Mn forms a fine crystallized product with aluminum.

Simply adding Mn to aluminum without a hardening element, such as Si and Mg, (Working Example 9) exhibited the high tensile strength at 330 MPa, and a micro Vickers hardness exhibited 90 while it is not indicated in the table. This value does not change even if the additive manufacturing product is heated to 400° C. For these phenomena, it is considered that Mn is dissolved in aluminum by a large amount during additive manufacturing, the fine precipitate is generated due to the heat during additive manufacturing, and the Mn—Al compound does not change the form in a high temperature range of 200° C. or more where a Mg—Al precipitate softens due to overaging, thus the high tensile strength and the high hardness are obtained. The fine crystallized product is also considered to be related.

TABLE 1

| | | | Si | Mg | Fe | Cu | Mn | Cr | Ni | Ti, Zr | Room-Temperature Tensile Strength (MPa) | Elongation (%) | Distortion |
|---|---|---|---|---|---|---|---|---|---|---|---|---|---|
| Comparative | 1 | | 3 | 0.35 | 0.1 | 0.01 | 0.01 | 0.00 | 0.01 | 0.00 | 150 | 2 | Fair |
| Example | 2 | | 10 | 0.37 | 0.15 | 0.01 | 0.02 | 0.00 | 0.01 | 0.00 | 410 | 6 | Good |
| | 3 | | 25 | 0.37 | 0.22 | 0.01 | 0.02 | 0.00 | 0.01 | 0.00 | 440 | 2 | Good |
| | 4 | | 10 | 0.37 | 0.15 | 0.01 | 6 | 5 | 0.01 | 0.00 | | | |
| | 5 | | 1.5 | 5.1 | 0.1 | 0.01 | 0.7 | 0.00 | 0.01 | 0.00 | | | |
| Working | 1 | | 4.5 | 0.35 | 0.10 | 0.01 | 0.5 | 0.00 | 0.01 | 0.00 | 450 | 6 | Good |
| Example | 2 | | 10 | 0.70 | 0.15 | 0.01 | 0.7 | 0.00 | 0.01 | 0.00 | 490 | 5 | Good |
| | 3 | | 10 | 0.70 | 0.15 | 0.01 | 0.7 | 0.00 | 0.01 | 0.00 | | | |

Forming Temperature during Additive Manufacturing 70° C.

TABLE 1-continued

| | | | | | | | | | | | |
|---|---|---|---|---|---|---|---|---|---|---|---|
| 4 | 10 | 0.70 | 0.15 | 0.01 | 1.5 | 0.00 | 0.01 | 0.00 | 550 | 3.5 | Good |
| 5 | 10 | 0.70 | 0.15 | 0.01 | 5.0 | 0.00 | 0.01 | 0.00 | 570 | 2.5 | Good |
| 6 | 10 | 0.37 | 0.15 | 0.01 | 10 | 0.00 | 0.01 | 0.00 | 575 | 1.5 | Good |
| 7 | 18 | 0.34 | 0.15 | 0.01 | 0.7 | 0.00 | 0.01 | 0.00 | 510 | 1.5 | Good |
| 8 | 10 | 0.35 | 0.15 | 3.1 | 0.7 | 0.00 | 1.0 | 0.00 | 550 | 3 | Good |
| 9 | 0 | 0.0 | 0.05 | 0.00 | 7 | 0.00 | 0.01 | 0.00 | 330 | 7 | Good |
| 10 | 10 | 0.70 | 0.15 | 0.01 | 0.01 | 0.7 | 0.01 | 0.00 | 480 | 8 | Good |
| 11 | 10 | 0.70 | 0.15 | 0.01 | 0.5 | 1.1 | 0.01 | 0.00 | | | |
| 12 | 10 | 0.70 | 0.15 | 0.01 | 0.01 | 5.0 | 0.01 | 0.00 | | | |
| 13 | 10 | 0.70 | 0.15 | 1.2 | 1.5 | 1.5 | 1.0 | 0.00 | | | |
| 14 | 10 | 0.70 | 0.15 | 1.2 | 1.5 | 1.5 | 1.0 | Zr 0.6 | | | |
| 15 | 10 | 0.70 | 0.15 | 0.01 | 0.7 | 0.00 | 0.01 | Ti 0.4 | 500 | 5 | Good |
| 16 | 1.5 | 5 | 0.1 | 0.01 | 0.7 | 0.00 | 0.01 | 0.00 | 360 | 12 | Good |
| 17 | 7 | 0.7 | 0.12 | 0.01 | 0.7 | 0.00 | 0.01 | 0.00 | | | |

Forming Temperature during Additive Manufacturing 200° C. (250° C.)

| | | Room-Temperature Tensile Strength (MPa) | Elongation (%) | Distortion | Alloy Series | Heat Treatment (T6 Process) P or N/P | Remarks | Manufacturing Method |
|---|---|---|---|---|---|---|---|---|
| Comparative Example | 1 | 150 | 2 | Fair | Al—Si | N/P | low Si | Laser Additive Manufacturing Method |
| | 2 | 290 | 5 | Excellent | | N/P | No Mn, No Cr | |
| | 3 | 320 | 3 | Excellent | | N/P | High Si | |
| | 4 | 440 | 2 | Excellent | | N/P | High Mn, Si Added | |
| | 5 | 290 | 8 | | Al—Mg | N/P | Mn, Si Added | High Pressure Casting Method |
| Working Example | 1 | 360 | 8 | Excellent | Al—Si | N/P | low Si | Laser Additive Manufacturing Method |
| | 2 | 390 | 6 | Excellent | | N/P | Mn, Si Added | |
| | 3 | <u>350</u> | <u>8</u> | Excellent | | N/P | Mn, Si Added, Forming Temperature during Additive Manufacturing 250° C. | |
| | 4 | 450 | 5 | Excellent | | N/P | Mn, Si Added | |
| | 5 | 470 | 4 | Excellent | | N/P | Middle Mn, Si Added | |
| | 6 | 480 | 3 | Excellent | | N/P | High Mn, Si Added | |
| | 7 | 400 | 5 | Excellent | | N/P | Mn, High Si Added | |
| | 8 | 450 | 5 | Excellent | | N/P | Mn, Si, Cu, Ni Added (Equivalent to AC8A) | |
| | 9 | 330 | 7 | Excellent | | N/P | Mn alone Added | |
| | 10 | 400 | 14 | Excellent | | N/P | Cr, Si Added, Forming Temperature during Additive Manufacturing 160° C. | |
| | 11 | 420 | 11 | Excellent | | N/P | Cr, Mn, Si Added, Forming Temperature during Additive Manufacturing 180° C. | |
| | 12 | 440 | 5 | Excellent | | N/P | Cr, Si Added | |
| | 13 | 430 | 4 | Excellent | | N/P | Cr, Mn, Si, Cu, Ni Added (Equivalent to AC8A) | |
| | 14 | 450 | 4 | Excellent | | N/P | Zr, Cr, Mn, Si, Cu, Ni Added (Equivalent to AC8A) | |

TABLE 1-continued

| | | | | | | |
|---|---|---|---|---|---|---|
| 15 | 400 | 6 | Excellent | | N/P | Mn, Si Added |
| 16 | 335 | 17 | Excellent | Al—Mg | N/P | Mn, Si Added |
| 17 | 455 | 8 | Excellent | Al—Si | N/P | Mn, Si Added |

P: T6 Process Performed
N/P: T6 Process not Performed

In Table 1 above,

Description of distortion . . . Excellent: no distortion, no cracking, Good: small distortion, no cracking, Fair: intergranular cracking (no outer surface cracking), Poor: cracking on molded body surface Every value of contained elements Si, Mg, Fe, Cu, Mn, and Ni is weight %. The same applies to Tables 2 to 4 below.

Working Examples 18 to 28, Comparative Examples 6 to 8

Using Al alloy powders (average particle diameter: 35 μm) having compositions indicated in Table 2 below, 14 types of additive manufacturing products (Working Examples 18 to 28, Comparative Examples 7 and 8) were formed in 10 mm×10 mm and length 80 mm by the laser additive manufacturing method, and specimens having a gauge length of 12 mm, a parallel portion width of 4 mm, and a whole length of 40 mm were cut out from the additive manufacturing products.

The holding temperature during additive manufacturing in the case of not heated during additive manufacturing was 70° C. (Working Examples 18 to 20, Comparative Example 7), and the holding temperatures during additive manufacturing in the case of preheated during additive manufacturing were 200° C. (Working Examples 18 to 21, and 23 to 28, Comparative Examples 7 and 8) or 250° C. (Working Example 22).

In Comparative Example 6, a molded body of JIS AC8A alloy as a representative of piston alloys was formed by a mold casting method as a conventional manufacturing method.

For these molded bodies, the high-temperature tensile strengths (MPa) and elongations (%) were measured, and the distortions of the molded bodies were observed. The high-temperature tensile strength is the tensile strength (MPa) at 300° C.

As indicated in Table 2 below, the molded body of Comparative Example 6 formed by the mold casting method exhibited the tensile strength of 80 MPa and the elongation of 25%. The additive manufacturing product of Comparative Example 7 molded with the AC8A alloy by the laser additive manufacturing method exhibited a high elongation value that the AC8A alloy has while the tensile strength was slightly low at 65 MPa.

For the additive manufacturing product of Comparative Example 8 without the T6 processing, the high-temperature tensile strength was high compared with Comparative Example 7 where the T6 processing was performed, but it was low compared with a mold casting material of Comparative Example 6.

Meanwhile, in Working Examples 18 to 20 where Mn was added to the AC8A alloy, in both cases of the holding temperatures during additive manufacturing of 70° C. and 200° C., the tensile strengths exhibited high values of 85 to 120 MPa. In Working Examples 21 and 22, even with the additive manufacturing temperature of 250° C. (Working Example 22), and even without the element, such as Ni and Cu, relating to the improvement of heat resistance (Working Examples 21 and 22), a high tensile strength of 80 MPa was exhibited due to containing Si, Mg, and Mn. These phenomena are considered caused by the fine precipitate and the fine crystallized product generated during additive manufacturing from Mn supersaturatedly dissolved in aluminum by a large amount during additive manufacturing, as described in the result indicated in Table 1 above.

Working Example 23 contains Cr, and Working Example 24 contains Cr and Mn. Similarly to Working Examples 18 to 22 where Mn alone was contained, the high high-temperature tensile strengths of 85 MPa or more were exhibited. For the additive manufacturing products of Working Examples 18 to 24, the T6 processing was performed, subsequently the additive manufacturing products were kept at 300° C. for 10 hours, and subsequently an elevated temperature tensile test was performed at 300° C., while for the additive manufacturing products of Working Examples 25 to 28, the elevated temperature tensile test was performed at 300° C. without the T6 processing. It is considered due to Mn and Cr that are dissolved by a large amount during additive manufacturing and still stably dissolved even at 300° C. and due to the fine crystallized product.

Working Examples 27 and 28 contain Ti and Zr, respectively, and exhibited the high tensile strengths that seem due to the effects of solid solution strengthening, precipitation strengthening, or crystal refinement by these elements.

TABLE 2

| | | | | | | | | | | Forming Temperature during Additive Manufacturing 70° C. | | |
|---|---|---|---|---|---|---|---|---|---|---|---|---|
| | | Si | Mg | Fe | Cu | Mn | Cr | Ni | Ti, Zr | High-Temperature Tensile Strength (MPa) | Elongation (%) | Distortion |
| Comparative Example | 6 | 11.8 | 1 | 0.13 | 1.1 | 0.01 | 0.00 | 1.3 | 0.00 | | | |
| | 7 | 11.8 | 1 | 0.13 | 1.1 | 0.01 | 0.00 | 1.3 | 0.00 | 65 | 60 | Good |
| | 8 | 11.8 | 1 | 0.13 | 1.1 | 0.01 | 0.00 | 1.3 | 0.00 | | | |

TABLE 2-continued

| | | | | | | | | | | | | |
|---|---|---|---|---|---|---|---|---|---|---|---|---|
| Working Example | 18 | 11.8 | 1 | 0.13 | 1.1 | 3.0 | 0.00 | 1.3 | 0.00 | 85 | 30 | Good |
| | 19 | 11.6 | 1 | 0.13 | 1.1 | 5.0 | 0.00 | 1.3 | 0.00 | 102 | 18 | Good |
| | 20 | 11.2 | 1 | 0.13 | 1.1 | 10 | 0.00 | 1.3 | 0.00 | 118 | 14 | Good |
| | 21 | 10 | 0.37 | 0.15 | 0.01 | 5 | 0.00 | 0.01 | 0.00 | | | |
| | 22 | 10 | 0.37 | 0.15 | 0.01 | 5 | 0.00 | 0.01 | 0.00 | | | |
| | 23 | 11.5 | 1 | 0.13 | 1.1 | 0.01 | 3.2 | 1.3 | 0.00 | | | |
| | 24 | 11.5 | 1 | 0.13 | 1.1 | 1.1 | 4.2 | 1.3 | 0.00 | | | |
| | 25 | 11.8 | 1 | 0.13 | 1.1 | 3.0 | 0.00 | 1.3 | 0.00 | | | |
| | 26 | 11.5 | 1 | 0.13 | 1.1 | 0.01 | 3.2 | 1.3 | 0.00 | | | |
| | 27 | 11.6 | 1 | 0.13 | 1.1 | 5.0 | 3.1 | 1.3 | Ti 0.4 | | | |
| | 28 | 11.6 | 1 | 0.13 | 1.1 | 5.0 | 3.1 | 1.3 | Zr 0.5 | | | |

Forming Temperature during Additive Manufacturing 200° C. (250° C.)

| | | High-Temperature Tensile Strength (MPa) | Elongation (%) | Distortion | Heat Treatment (T6 Process) P or N/P | Remarks | Manufacturing Method |
|---|---|---|---|---|---|---|---|
| Comparative Example | 6 | 80 | 25 | | P | JIS AC8A Alloy | Mold Casting Method |
| | 7 | 65 | 60 | Excellent | P | JIS AC8A Alloy | Laser Additive Manufacturing Method |
| | 8 | 75 | 33 | Excellent | N/P | JIS AC8A Alloy | |
| Working Example | 18 | 85 | 40 | Excellent | P | AC8A + 3% Mn | |
| | 19 | 100 | 30 | Excellent | P | AC8A + 5% Mn | |
| | 20 | 120 | 15 | Excellent | P | AC8A + 10% Mn | |
| | 21 | 80 | 40 | Excellent | P | Mn, Si Added | |
| | 22 | 80 | 40 | Excellent | P | Mn, Si Added, Forming Temperature during Additive Manufacturing 250° C. | |
| | 23 | 85 | 40 | Excellent | P | AC8A + 3% Cr | |
| | 24 | 105 | 40 | Excellent | P | AC8A + 1% Mn + 4% Cr | |
| | 25 | 127 | 30 | Excellent | N/P | AC8A + 3% Mn | |
| | 26 | 143 | 27 | Excellent | N/P | AC8A + 3% Cr | |
| | 27 | 147 | 30 | Excellent | N/P | AC8A + 5% Mn + 3% Cr + 0.4% Ti | |
| | 28 | 150 | 29 | Excellent | N/P | AC8A + 5% Mn + 3% Cr + 0.5% Zr | |

P: T6 Process Performed
N/P: T6 Process not Performed

In Table 2 above,
Description of distortion . . . Excellent: no distortion, no cracking, Good: small distortion, no cracking, Fair: intergranular cracking (no outer surface cracking), Poor: cracking on molded body surface Heating Process before Elevated Temperature Tensile Test . . . 1) T6 processing on molded body (510° C.×two hours to water quenching to 170° C.×four hours), subsequently, 300° C.×10 hours 2) Additive manufacturing product without T6 processing at 300° C.×10 hours Condition of Elevated Temperature Tensile Test . . . Keeping at 300° C.×10 minutes, subsequently, test with strain rate 5 mm/min

Working Examples 29 to 51, Comparative Examples 9 to 14

Using Al alloy powders (average particle diameter: 35 µm) having compositions indicated in Table 3 below, 25 types of additive manufacturing products (Working Examples 29 to 51, Comparative Examples 10 to 14) were formed in 10 mm×10 mm and length 80 mm by the laser additive manufacturing method, and specimens having a gauge length of 12 mm, a parallel portion width of 4 mm, and a whole length of 40 mm were cut out from the additive manufacturing products.

The holding temperature during additive manufacturing in the case of not heated during additive manufacturing was 70° C., and the holding temperature during additive manufacturing in the case of preheated during additive manufacturing was 200° C.

In comparative example 9, a molded body of JIS AC8A alloy as a representative of piston alloys was formed by a mold casting method as a conventional manufacturing method.

For these molded bodies, the high-temperature tensile strengths (MPa) and elongations (%) were measured, and the distortions of the molded bodies were observed. The high-temperature tensile strength is the tensile strength (MPa) at 300° C.

As indicated in Table 3 below, the molded body of Comparative Example 9 formed by the mold casting method exhibited the tensile strength of 80 MPa and the elongation of 25%. The additive manufacturing product of Comparative Example 10 molded with the AC8A alloy by the laser additive manufacturing method exhibited a high elongation value that the AC8A alloy has while the tensile strength was slightly low at 65 MPa. In comparative examples 11 to 13, when Mn is contained by 2 weight % or more and both Fe and Mn are contained by a large amount, large hot cracks are generated on the surface and the inside of the additive manufacturing products, and thus, the laminated molded products cannot be obtained. For Comparative Example 14, the hot cracking does not occur but the elongation is low due to the single addition of Fe.

Meanwhile, the alloys used in Working Examples 29 to 51 are AC8A alloys that contain 3 to 9 weight % Fe and 1.5 weight % or less Mn, or AC8A alloys that contain 0.3 to 2 weight % Fe and 1.5 to 10 weight % Mn or Cr. As indicated in Table 3 below, in any of Working Examples 29 to 51, and in both cases of the holding temperatures during additive manufacturing of 70° C. and 200° C., the hot cracking did not occur in the additive manufacturing product.

When the aluminum alloy contains one or more of Mn and Cr having the total weight exceeding 1.5 weight % and 10 weight % or less, the Fe content is restrained to exceeding 0.3 weight % and 2 weight % or less, and when Fe is contained by exceeding 1 weight % and 10 weight % or less, the total weight of Mn and Cr is restrained to 1.5 weight % or less, thus the additive manufacturing product becomes less likely to be cracked. In any of the single addition of Fe or the combined addition of one or more of Fe, Cr, and Mn, the additive manufacturing products of Working Examples 29 to 51 exhibit the high-temperature tensile strength higher than the high-temperature tensile strength of 80 MPa exhibited by the molded body of comparative example 9.

Especially, as indicated also in Table 2, not only in the case of containing Fe alone, but also in the case of containing one or more of Fe, Cr, and Mn, the high-temperature tensile strength at 300° C. as the evaluation of the additive manufacturing product (as built) without the heat treatment (T6 processing) exhibits a value of about 1.5 times or more compared with the high-temperature tensile strength with the T6 processing to the additive manufacturing product. This is considered to be caused as follows: by keeping at 500° C. or more in the T6 processing, (1) the elements of Fe, Mn, and Cr supersaturatedly dissolved in the aluminum matrix during additive manufacturing are coarsely precipitated when the temperature rises, and these elements are not dissolved again in the additive manufacturing product (as built) or more by the quenching thereafter, and (2) the forms of the fine crystallized product (eutectic Si and compound containing metal, such as Fe, Mn, and Cr) formed in the additive manufacturing product (as built) are changed to be coarsened.

Figure 4:
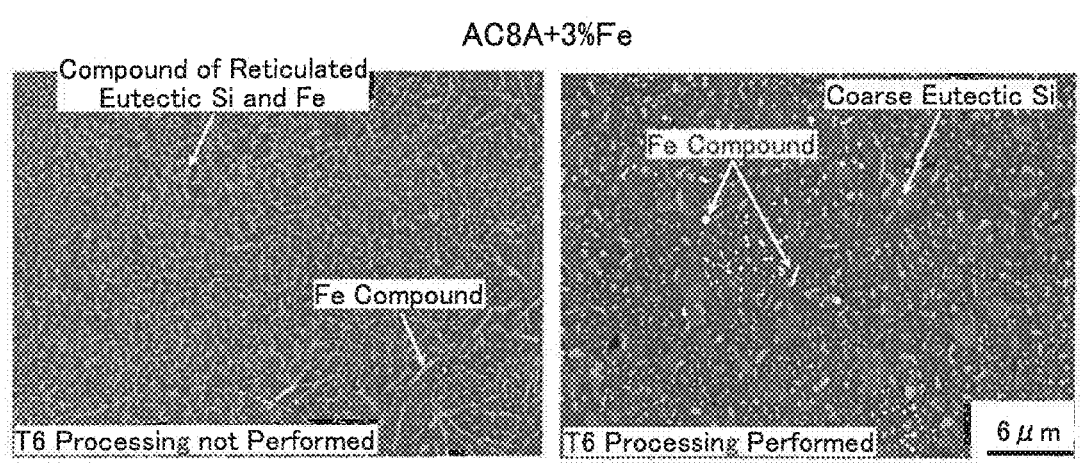
FIG. 4 includes photographs illustrating structures of additive manufacturing products according to Working Examples 49 and 33.
Figure 5:
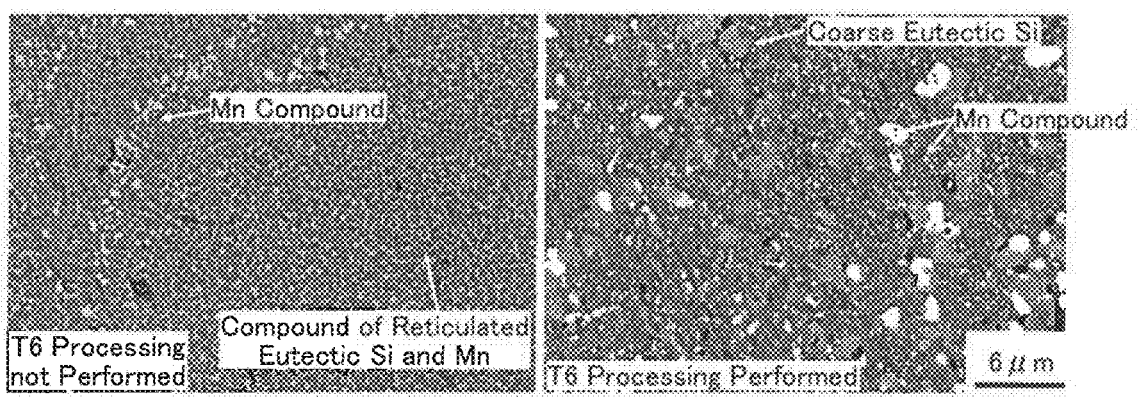
FIG. 5 includes photographs illustrating structures of additive manufacturing products according to Working Examples 25 and 18.
Figure 6:
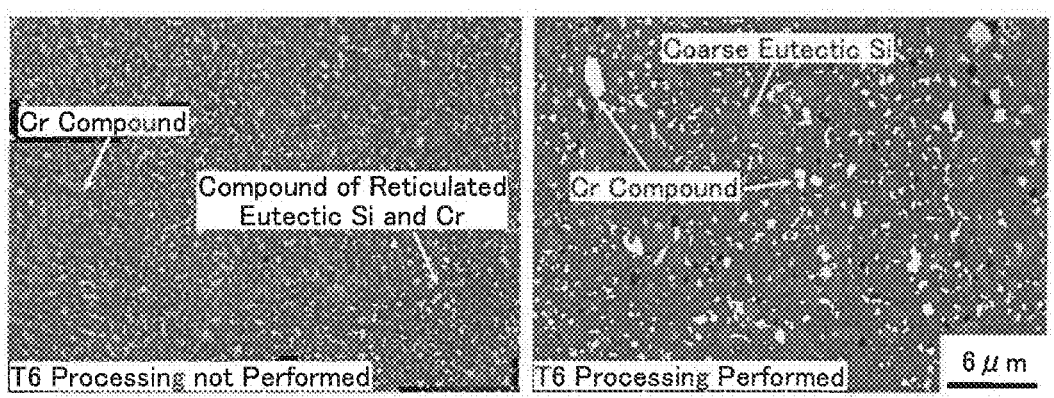
FIG. 6 includes photographs illustrating structures of additive manufacturing products according to Working Examples 26 and 23.

FIG. 4 to FIG. 6 illustrate metal structures of the additive manufacturing product before and after the T6 processing. FIG. 4 includes photographs illustrating the structures of the additive manufacturing products (AC8A+3% Fe) according to Working Examples 49 and 33. FIG. 5 includes photographs illustrating the structures of the additive manufacturing products (AC8A+3% Mn) according to Working Examples 25 and 18. FIG. 6 includes photographs illustrating the structures of the additive manufacturing products (AC8A+3% Cr) according to Working Examples 26 and 23. Working Examples 49, 25, and 26 are the additive manufacturing products after the additive manufacturing before performing the heat treatment (T6 processing), and Working Examples 33, 18, and 23 are the additive manufacturing products after the additive manufacturing after performing the heat treatment (T6 processing). As illustrated in FIGS. 4 to 6, it is seen that by the T6 processing, the reticulated eutectic Si is coarsened to 2 to 3 μm, and the reticulated compound of transition metal is also coarsened in a granular shape to 1 μm or more.

Working Examples 43 to 47 are additive manufacturing products where titanium (Ti), zirconium (Zr), vanadium (V), scandium (Sc), and lithium (Li), which have a characteristic to form a non-equilibrium microstructure with an aluminum having an $L1_2$ ordered structure, are added, respectively. As indicated in Table 3, it is seen that adding these elements increases the high-temperature tensile strength by about 4 to 10 MPa compared with the case of no addition. It is difficult in manufacturing and causes reduction in ductility to have values of the additive amounts of these elements exceeding the above-described range. When the heat treatment is not performed to the additive manufacturing product to 500° C. or more, the precipitation hardening occurs more.

Working Example 38 is a case where the aluminum alloy containing Si by a large amount, and exhibits a value higher than that in a case where the AC8A alloy is used.

TABLE 3

| | | | | | | | | | | Forming Temperature during Additive Manufacturing | | | |
| --- | --- | --- | --- | --- | --- | --- | --- | --- | --- | --- | --- | --- | --- |
| | | | | | | | | | | 70° C. | | | 200° C. |
| | | Si | Mg | Fe | Cu | Mn | Cr | Ni | Ti, Zr, Sc, Li, V | High-Temperature Tensile Strength (MPa) | Elongation (%) | Distortion | High-Temperature Tensile Strength (MPa) |
| Comparative Example | 9 | 11.8 | 1 | 0.13 | 1.1 | 0.01 | 0.00 | 1.3 | 0.00 | | | | 80 |
| | 10 | 11.8 | 1 | 0.13 | 1.1 | 0.01 | 0.00 | 1.3 | 0.00 | 65 | 60 | Good | 65 |
| | 11 | 11.5 | 1 | 3.0 | 1.1 | 2.0 | 0.00 | 1.1 | 0.00 | | | | |
| | 12 | 11.3 | 1 | 5.0 | 1.2 | 2.0 | 0.00 | 1.1 | 0.00 | | | | |
| | 13 | 11.1 | 1 | 3.0 | 1.1 | 5.0 | 0.00 | 1.1 | 0.00 | | | | |
| | 14 | 11.1 | 1 | 11.0 | 1.1 | 0.0 | 0.00 | 1.1 | 0.00 | 121 | 13 | Good | 121 |
| Working Example | 29 | 11.8 | 1 | 0.5 | 1.1 | 4.0 | 0.00 | 1.3 | 0.00 | 92 | 23 | Good | 90 |
| | 30 | 11.7 | 1 | 1.0 | 1.1 | 5.0 | 0.00 | 1.3 | 0.00 | 98 | 20 | Good | 100 |
| | 31 | 11.5 | 1 | 1.0 | 1.1 | 10 | 0.00 | 1.3 | 0.00 | 121 | 18 | Good | 120 |
| | 32 | 11.8 | 1 | 1.5 | 1.1 | 2 | 0.00 | 1.2 | 0.00 | 89 | 26 | Good | 85 |
| | 33 | 11.8 | 1 | 3.0 | 1.1 | 0.01 | 0.00 | 1.2 | 0.00 | 87 | 30 | Good | 86 |
| | 34 | 11.8 | 1 | 5.0 | 1.1 | 0.01 | 0.00 | 1.2 | 0.00 | 90 | 35 | Good | 99 |
| | 35 | 11.8 | 1 | 9.0 | 1.1 | 0.01 | 0.00 | 1.2 | 0.00 | 101 | 28 | Good | 110 |

TABLE 3-continued

| | | | | | | | | | | | | |
|---|---|---|---|---|---|---|---|---|---|---|---|---|
| 36 | 11.8 | 1 | 4.0 | 1.1 | 1.1 | 0.00 | 1.2 | 0.00 | 90 | 33 | Good | 95 |
| 37 | 11.8 | 1 | 5.0 | 1.1 | 0.5 | 0.00 | 1.2 | 0.00 | 92 | 36 | Good | 97 |
| 38 | 26.0 | 1 | 4.0 | 1.1 | 1.1 | 0.00 | 1.2 | 0.00 | 87 | 26 | Good | 112 |
| 39 | 11.5 | 1 | 1.0 | 1.1 | 0.01 | 5.0 | 1.3 | 0.00 | 98 | 20 | Good | 100 |
| 40 | 11.8 | 1 | 0.5 | 1.1 | 0.01 | 3.0 | 1.3 | 0.00 | 92 | 23 | Good | 95 |
| 41 | 11.5 | 1 | 1.0 | 1.1 | 0.01 | 5.0 | 1.3 | 0.00 | | | Good | 160 |
| 42 | 11.8 | 1 | 0.5 | 1.1 | 0.01 | 3.0 | 1.3 | 0.00 | | | Good | 145 |
| 43 | 11.8 | 1 | 0.5 | 1.1 | 0.01 | 3.0 | 1.3 | Ti 0.4 | | | Good | 149 |
| 44 | 11.8 | 1 | 0.5 | 1.1 | 0.01 | 3.0 | 1.3 | Zr 0.5 | | | Good | 155 |
| 45 | 11.8 | 1 | 3.1 | 1.1 | 0.01 | 0.0 | 1.3 | V 0.6 | | | | 172 |
| 46 | 11.8 | 1 | 3.2 | 1.3 | 0.01 | 0.0 | 1.3 | Sc 0.3 | | | | 174 |
| 47 | 11.8 | 1 | 3.1 | 1.2 | 0.01 | 0.0 | 1.3 | Li 0.9 | | | | 176 |
| 48 | 11.8 | 1 | 2.0 | 1.1 | 0.01 | 0.00 | 1.2 | 0.00 | | | | 150 |
| 49 | 11.8 | 1 | 3.1 | 1.1 | 0.01 | 0.00 | 1.2 | 0.00 | | | | 165 |
| 50 | 11.8 | 1 | 5.0 | 1.1 | 0.01 | 0.00 | 1.2 | 0.00 | | | | 185 |
| 51 | 11.8 | 1 | 3.0 | 1.1 | 0.5 | 0.5 | 1.2 | 0.00 | | | | 175 |

| | | Forming Temperature during Additive Manufacturing 200° C. | | Heat Treatment | | |
|---|---|---|---|---|---|---|
| | | Elongation (%) | Distortion | (T6 Process) P or N/P | Remarks | Manufacturing Method |
| Comparative Example | 9 | 25 | | P | JIS AC8A Alloy | Mold Casting Method |
| | 10 | 60 | Excellent | P | JIS AC8A Alloy | Laser Additive Manufacturing Method |
| | 11 | | Poor | P | AC8A + 3% Fe + 2.0% Mn | |
| | 12 | | Poor | P | AC8A + 5% Fe + 2.0% Mn | |
| | 13 | | Poor | P | AC8A + 3% Fe + 5.0% Mn | |
| | 14 | 14 | Good | P | AC8A + 11% Fe | |
| Working Example | 29 | 35 | Excellent | P | AC8A + 0.5% Fe + 3% Mn | |
| | 30 | 27 | Excellent | P | AC8A + 1% Fe + 5% Mn | |
| | 31 | 22 | Excellent | P | AC8A + 1% Fe + 10% Mn | |
| | 32 | 40 | Excellent | P | AC8A + 1.5% Fe + 2.0% Mn | |
| | 33 | 38 | Excellent | P | AC8A + 3% Fe | |
| | 34 | 36 | Excellent | P | AC8A + 5% Fe | |
| | 35 | 30 | Excellent | P | AC8A + 9% Fe | |
| | 36 | 38 | Excellent | P | AC8A + 4% Fe + 1% Mn | |
| | 37 | 40 | Excellent | P | AC8A + 5% Fe + 0.5% Mn | |
| | 38 | 20 | Excellent | P | 20% Si Series + 4% Fe + 1% Mn | |
| | 39 | 23 | Excellent | P | AC8A + 1% Fe + 5% Cr | |
| | 40 | 30 | Excellent | P | AC8A + 0.5% Fe + 3% Cr | |
| | 41 | 22 | Excellent | N/P | AC8A + 1% Fe + 5% Cr | |
| | 42 | 24 | Excellent | N/P | AC8A + 0.5% Fe + 3% Cr | |
| | 43 | 26 | Excellent | N/P | AC8A + 0.5% Fe + 3% Cr + 0.5% Ti | |
| | 44 | 25 | Excellent | N/P | AC8A + 0.5% Fe + 3% Cr + 0.5% Zr | |
| | 45 | 20 | Excellent | N/P | AC8A + 3% Fe + 0.6V | |
| | 46 | 19 | Excellent | N/P | AC8A + 3% Fe + 0.3Sc | |
| | 47 | 18 | Excellent | N/P | AC8A + 3% Fe + 0.9Li | |
| | 48 | 22 | Excellent | N/P | AC8A + 2% Fe | |
| | 49 | 22 | Excellent | N/P | AC8A + 3% Fe | |
| | 50 | 25 | Excellent | N/P | AC8A + 5% Fe | |
| | 51 | 28 | Excellent | N/P | AC8A + 3% Fe + 0.5Mn + 0.5%Cr | |

P: T6 Process Performed
N/P: T6 Process not Performed

In Table 3 above,

Description of distortion . . . Excellent: no distortion, no cracking, Good: small distortion, no cracking, Fair: intergranular cracking (no outer surface cracking), Poor: cracking on molded body surface Heating Process before Elevated Temperature Tensile Test . . . 1) T6 processing on molded body (510° C.×two hours to water quenching to 170° C.×four hours), subsequently, 300° C.×10 hours 2) Additive manufacturing product without T6 processing at 300° C.×10 hours Condition of Elevated Temperature Tensile Test . . . Keeping at 300° C.×10 minutes, subsequently, test with strain rate 5 mm/min Working Examples 52 to 71, Comparative Examples 15 to 20

Using Al alloy powders (average particle diameter: 35 μm) having compositions indicated in Table 4 below, 24 types of additive manufacturing products (Working Examples 52 to 71, Comparative Examples 17 to 20) were formed in 10 mm×10 mm and length 80 mm by the electron beam additive manufacturing method, and specimens having a gauge length of 12 mm, a parallel portion width of 4 mm, and a whole length of 40 mm were cut out from the additive manufacturing products. The holding temperature during additive manufacturing was 450° C. The holding temperatures during additive manufacturing of Working Examples 69 to 71 were 350° C., 300° C., and 260° C., respectively.

The holding temperature during additive manufacturing of Comparative Example 20 was 480° C.

In comparative example 15, a molded body of JIS AC8A alloy as a representative of piston alloys was formed by a mold casting method as a conventional manufacturing method.

In comparative example 16, a similar additive manufacturing product was formed by the laser additive manufacturing method.

For these molded bodies, the high-temperature tensile strengths (MPa) and elongations (%) were measured, the distortions of the molded bodies were observed, and sizes of the compounds were measured. The high-temperature tensile strength is the tensile strength (MPa) at 300° C.

As indicated in Table 4 below, the molded body of Comparative Example 15 formed by the mold casting method exhibited the tensile strength of 80 MPa and the elongation of 25%. The additive manufacturing product of Comparative Example 16 molded with the AC8A alloy by the laser additive manufacturing method exhibited a high elongation value that the AC8A alloy has while the high-temperature tensile strength was low at 62 MPa.

The additive manufacturing products of Comparative Examples 17 to 19 formed by the electron beam additive manufacturing method have the total amount of Fe and Mn exceeding 10 weight %, and since the heat amounts added to the Al—Fe compound and the Fe—Mn compound formed during additive manufacturing are greater than those in the laser additive manufacturing method, the sizes of the compounds become coarse exceeding 200 μm to cause the low elongation in the elevated temperature tensile test. However, because of the high holding temperature during additive manufacturing of 450° C., the cracking does not occur in the additive manufacturing product. This is considered because of the decreased thermal stress due to the decreased difference between the temperature immediately after melting and the temperature before melting. In Comparative Example 20, since the holding temperature during additive manufacturing is high (480° C.) close to a melting point of the alloy to be laminated, the size of the intermetallic compound is coarsened compared with the case of 450° C., and the tensile strength and the elongation are low compared with Working Example 56.

Meanwhile, the alloys used in Working Examples 52 to 66 are AC8A alloys having the total amount of Fe, Cr, and Mn of 1.01 to 1.0 to 10 weight %. As indicated in Table 4 below, in any of the additive manufacturing products of Working Examples 52 to 68, since the holding temperature during additive manufacturing by the electron beam additive manufacturing method is high at 450° C., the hot cracking does not occur in the additive manufacturing product. The high-temperature tensile strength is equal to or higher than those of the AC8A alloys (Comparative Examples 15 and 16).

However, for the additive manufacturing products by the electron beam additive manufacturing method, the compounds are coarsened since the additive manufacturing products are largely affected by heat during additive manufacturing, and the elements, such as Fe, Cr, and Mn cannot be supersaturatedly dissolved in aluminum. Therefore, as indicated in Table 2 and Table 3, the tensile strength of the additive manufacturing product without the heat treatment did not exhibit the strength higher than that of the additive manufacturing product to which the T6 processing was performed.

Compared with the tensile strength and the elongation in Working Example 55 indicated in Table 4, the additive manufacturing product without the heat treatment indicated as Working Example 67 exhibited slightly low values.

The alloys used in Working Examples 68 to 70 have the total amount of Fe, Cr, and Mn in a range of 1.0 to 10 weight %. Working Example 68 was the AC8A alloy having the Cr content of 3.1 weight %, and exhibited the tensile strength and the elongation similar to those of the additive manufacturing product in Working Example 55 to which Mn was added. The holding temperatures during additive manufacturing of Working Examples 69 to 71 are 350° C., 300° C., and 260° C., respectively. With an additive manufacturing holding temperature at 350° C., the tensile strength and the elongation higher than those in Working Example 52 (additive manufacturing holding temperature at 450° C., heat treatment performed) were exhibited even it is simply laminated (without the heat treatment). This is due to reduced coarsening of the intermetallic compound containing Fe and Mn during laminate molding. Furthermore, with decrease of the holding temperature during additive manufacturing to 300° C. and to 260° C., its size is further decreased and the higher tensile strength is exhibited.

TABLE 4

| | | Si | Mg | Fe | Cu | Mn | Cr | Ni | High-Temperature Tensile Strength (MPa) | Elongation (%) | Distortion | Compound Size 200 μm or More |
|---|---|---|---|---|---|---|---|---|---|---|---|---|
| | | | | | | | | | Tensile Property | | | |
| Comparative Example | 15 | 11.8 | 1 | 0.13 | 1.1 | 0.01 | 0.00 | 1.3 | 80 | 25 | | Good |
| | 16 | 11.8 | 1 | 0.13 | 1.1 | 0.01 | 0.00 | 1.3 | 62 | 65 | Excellent | Good |
| | 17 | 11.5 | 1 | 6.0 | 1.1 | 6.0 | 0.00 | 1.1 | 110 | 7 | Excellent | Poor |
| | 18 | 11.3 | 1 | 0.15 | 1.2 | 11.0 | 0.00 | 1.1 | 115 | 5 | Excellent | Poor |
| | 19 | 11.1 | 1 | 11.0 | 1.1 | 0.0 | 0.00 | 1.1 | 120 | 4 | Excellent | Poor |
| | 20 | 11.8 | 1 | 5.0 | 1.1 | 0.5 | 0.00 | 1.3 | 75 | 8 | Excellent | Poor |
| Working Example | 52 | 11.5 | 1 | 3.0 | 1.1 | 2.0 | 0.00 | 1.1 | 110 | 12 | Excellent | Good |
| | 53 | 11.3 | 1 | 5.0 | 1.2 | 2.0 | 0.00 | 1.1 | 120 | 11 | Excellent | Good |
| | 54 | 11.1 | 1 | 3.0 | 1.1 | 5.0 | 0.00 | 1.1 | 115 | 13 | Excellent | Good |
| | 55 | 11.1 | 1 | 3.0 | 1.1 | 0.5 | 0.00 | 1.1 | 88 | 27 | Excellent | Good |
| | 56 | 11.8 | 1 | 5.0 | 1.1 | 0.5 | 0.00 | 1.3 | 105 | 22 | Excellent | Good |
| | 57 | 11.5 | 1 | 1.0 | 1.1 | 10 | 0.00 | 1.3 | 85 | 25 | Excellent | Good |
| | 58 | 11.7 | 1 | 10.0 | 1.1 | 0.5 | 0.00 | 1.3 | 97 | 18 | Excellent | Good |
| | 59 | 11.7 | 1 | 0.12 | 1.1 | 7.0 | 0.00 | 1.3 | 100 | 20 | Excellent | Good |
| | 60 | 11.8 | 1 | 1.0 | 1.1 | 0.01 | 0.00 | 1.2 | 80 | 35 | Excellent | Good |
| | 61 | 11.8 | 1 | 0.15 | 1.1 | 9 | 0.00 | 1.2 | 110 | 17 | Excellent | Good |
| | 62 | 11.8 | 1 | 0.15 | 1.1 | 9 | 0.00 | 1.2 | 108 | 14 | Excellent | Good |

TABLE 4-continued

| 63 | 11.8 | 1 | 1.5 | 1.1 | 2 | 0.00 | 1.2 | 83 | 15 | Excellent | Good |
|---|---|---|---|---|---|---|---|---|---|---|---|
| 64 | 11.8 | 1 | 3.0 | 1.1 | 0.01 | 0.00 | 1.2 | 87 | 21 | Excellent | Good |
| 65 | 11.8 | 1 | 5.0 | 1.1 | 0.01 | 0.00 | 1.2 | 94 | 17 | Excellent | Good |
| 66 | 11.8 | 1 | 4.0 | 1.1 | 1.1 | 0.00 | 1.2 | 95 | 15 | Excellent | Good |
| 67 | 11.1 | 1 | 3.0 | 1.1 | 0.5 | 0.00 | 1.1 | 83 | 20 | Excellent | Good |
| 68 | 11.8 | 1 | 0.1 | 1.1 | 0.01 | 3.1 | 1.2 | 85 | 23 | Excellent | Good |
| 69 | 11.5 | 1 | 3.0 | 1.1 | 2.0 | 0.00 | 1.1 | 121 | 16 | Excellent | Good |
| 70 | 11.5 | 1 | 3.0 | 1.1 | 2.0 | 0.00 | 1.1 | 129 | 24 | Excellent | Good |
| 71 | 11.5 | 1 | 3.0 | 1.1 | 2.0 | 0.00 | 1.1 | 135 | 27 | Excellent | Good |

| | | Forming Temperature during Additive Manufacturing | Heat Treatment (T6 Process) P or N/P | Remarks | Manufacturing Method |
|---|---|---|---|---|---|
| Comparative Example | 15 | 450 | P | JIS AC8A Alloy | Mold Casting Method |
| | 16 | 450 | P | JIS AC8A Alloy | Laser Additive Manufacturing Method |
| | 17 | 450 | P | AC8A + 6% Fe + 6.0% Mn | Electron Beam Additive Manufacturing Method |
| | 18 | 450 | P | AC8A + 11% Mn | |
| | 19 | 450 | P | AC8A + 11% Fe | |
| | 20 | 480 | P | AC8A + 5% Fe + 0.5% Mn | |
| Working Example | 52 | 450 | P | AC8A + 3% Fe + 2.0% Mn | Electron Beam Additive Manufacturing Method |
| | 53 | 450 | P | AC8A + 5% Fe + 2.0% Mn | |
| | 54 | 450 | P | AC8A + 2% Fe + 5.0% Mn | |
| | 55 | 450 | P | AC8A + 3% Fe + 0.3% Mn | |
| | 56 | 450 | P | AC8A + 5% Fe + 0.5% Mn | |
| | 57 | 450 | P | AC8A + 0.5% Fe + 2% Mn | |
| | 58 | 450 | P | AC8A + 0.5% Fe + 6% Mn | |
| | 59 | 450 | P | AC8A + 7Mn | |
| | 60 | 450 | P | AC8A + 1.0% Fe | |
| | 61 | 450 | P | AC8A + 9% Mn | |
| | 62 | 450 | P | AC8A + 9% Fe | |
| | 63 | 450 | P | AC8A + 1.5% Fe + 2.0% Mn | |
| | 64 | 450 | P | AC8A + 3% Fe | |
| | 65 | 450 | P | AC8A + 5% Fe | |
| | 66 | 450 | P | AC8A + 4% Fe + 1% Mn | |
| | 67 | 450 | N/P | AC8A + 3% Fe + 0.3% Mn | |
| | 68 | 450 | P | AC8A + 3% Cr | |
| | 69 | 350 | N/P | AC8A + 3% Fe + 2.0% Mn | |
| | 70 | 300 | N/P | AC8A + 3% Fe + 2.0% Mn | |
| | 71 | 260 | N/P | AC8A + 3% Fe + 2.0% Mn | |

P: T6 Process Performed
N/P: T6 Process not Performed

In Table 4 above,

Description of distortion . . . Excellent: no distortion, no cracking, Good: small distortion, no cracking, Fair: intergranular cracking (no outer surface cracking), Poor: cracking on molded body surface Longest Diameter Size of Compound . . . Good: less than 200 μm, Poor: 200 μm or more Heating Process before Elevated Temperature Tensile Test . . . 1) T6 processing on molded body (510° C.×two hours to water quenching to 170° C.×four hours), subsequently, 300° C.×10 hours 2) Additive manufacturing product without T6 processing at 300° C.×10 hours Condition of Elevated Temperature Tensile Test . . . Keeping at 300° C.×10 minutes, subsequently, test with strain rate 5 mm/min Working Examples 72 to 74, Comparative Examples 21 to 22

Working Examples 72 to 74 indicated in Table 5 show examples of aluminum alloy product formed by forming a raw metal by a rapid solidification method, the raw metal being made of an aluminum alloy, the aluminum alloy containing Fe and one or more of Mn and Cr, the Fe being an inevitable impurity of 0.3 weight % or less, the one or more of Mn and Cr having a total weight of 0.3 to 10 weight %, and the aluminum alloy product containing anyone or more of an intermetallic compound and an aluminum alloy solid solution, the intermetallic compound containing two or more of Al, Mn, Fe, and Cr, one or more elements of Mn, Fe, and Cr being dissolved in the aluminum alloy solid solution. The Working Examples 72 to 74 show examples of Al-7% Si—0.7% Mg-0.7% Mn alloy. The Example 72 is an additive manufacturing product obtained by forming the raw material metal by the above-described additive manufacturing method, whereas the Examples 73 and 74 are the aluminum alloy products formed by rapidly solidified at a rate of 1000° C./s or more by twin roll casting. The aluminum alloy products of Examples 73 and 74 exhibit high tensile strength (425, 440 MPa) equivalent to the additive manufacturing product of Example 72. On the other hand, in the comparative example, since the solidification rate is slow, the tensile strength at the level of Examples 73 and 74 is not shown.

TABLE 5

| | | Manufacturing Method | Solidification Rate °C./s | Forming Temparature during Additive Manufacturing | Alloy | Tensile Strength MPa | Heat Treatment |
|---|---|---|---|---|---|---|---|
| Comparative Example | 21 | Mold Casting Method | 5 | | Al—7% Si—0.7% Mg—0.7% Mn Alloy | 310 | T6 |
| | 22 | High Pressure CastingMethod | 100 | | Al—7% Si—0.7% Mg—0.7% Mn Alloy | 330 | T6 |
| Working Example | 72 | Laser Additive Manufacturing Mrthod | 1000 | 200 | Al—7% Si—0.7% Mg—0.7% Mn Alloy | 450 | N/P |
| | 73 | Twin Roll Casting Method | 1000 or more | | Al—7% Si—0.7% Mg—0.7% Mn Alloy | 425 | N/P |
| | 74 | Twin Roll Casting Method | 1000 or more | | Al—7% Si—0.7% Mg—0.7% Mn Alloy | 440 | T5 |

In the above-mentioned Table 5, T6 means 530° C.×4 hours→water quenching→160° C.×3 hours, and T5 means 160° C.×3 hours. The solidification rate was estimated from the microstructure of each material. The high-pressure cast material is a flat plate having a thickness of 10×100×100 mm manufactured by a squeeze method with a metal pressure of 100 MPa. Mold casting is a casting material cast into a JIS boat-shaped mold (28×39×200 mm).

The invention claimed is:

1. A method for manufacturing an aluminum alloy additive manufacturing product, comprising
performing additive manufacturing including depositing a metal powder, the metal powder being made of an aluminum alloy, the aluminum alloy containing:
Fe as an inevitable impurity of 0.3 weight % or less,
Si in an amount that is in a range of from 7 to 20 weight %,
Mn in an amount that is in a range of from 0.7 to 10 weight %,
Cu in an amount that is 0.01 weight % or more and is 1.1 weight % or less,
optionally additive components containing any one or more elements being selected from a first group consisting of 0.2 to 7 weight % Mg, and 0.5 to 3 weight % Ni, or any one or more elements being selected from the first group and any one or more elements being selected from a second group consisting of 0.2 to 5 weight % Zr, 0.2 to 5 weight % Sc, 0.2 to 10 weight % Li, and 0.2 to 5 weight % V, and
a balance being Al,
wherein
the aluminum alloy contains no added Ti.

2. The method for manufacturing the aluminum alloy additive manufacturing product according to claim 1, wherein the additive manufacturing is performed with a measurement temperature of a substrate plate controlled to 150 to 250° C., and when depositing the metal powder, the metal powder is placed on the substrate plate.

3. The method for manufacturing the aluminum alloy additive manufacturing product according to claim 1, wherein
the amount of Si is in a range of from 7 to 15 weight %,
the aluminum alloy contains 0.2 to 1.0 weight % Mg, and
the amount of Mn is in a range of from 0.7 to 2.5 weight %.

4. The method for manufacturing the aluminum alloy additive manufacturing product according to claim 1, wherein
the amount of Si is in a range of from 8 to 20 weight %,
the aluminum alloy contains:
0.5 to 2.0 weight % Mg, and
0.5 to 3 weight % Ni, and
the amount of Mn is 1.5 to 5.0 weight %.

5. A method for manufacturing an aluminum alloy additive manufacturing product, comprising
performing additive manufacturing including depositing a metal powder, the metal powder being made of an aluminum alloy, the aluminum alloy containing:
Fe in an amount that exceeds 0.3 weight % and is 2 weight % or less,
Si in an amount that is in a range of from 4 to 30 weight %,
Mn in an amount that exceeds 1.5 weight % and is 10 weight % or less,
optionally additive components containing any one or more elements being selected from a first group consisting of 0.5 to 5 weight % Mg, 0.5 to 5 weight % Cu, and 0.5 to 3 weight % Ni, or any one or more elements being selected from the first group and any one or more elements being selected from a second group consisting of 0.2 to 5 weight % Zr, 0.2 to 5 weight % Sc, 0.2 to 10 weight % Li, and 0.2 to 5 weight % V, and
a balance being Al,
wherein
the aluminum alloy contains no added Ti.

6. A method for manufacturing an aluminum alloy additive manufacturing product, comprising
performing additive manufacturing including depositing a metal powder, the metal powder being made of an aluminum alloy, the aluminum alloy containing:
Fe in an amount that is 1 weight % or more and 10 weight % or less,
Si in an amount that is in a range of from 4 to 30 weight %,
Mn in an amount that is 1.5 weight % or less,
Cu in an amount that is 0.5 weight % or more and is 1.3 weight % or less,
optionally additive components containing any one or more elements being selected from a first group consisting of 0.5 to 5 weight % Mg and 0.5 to 3 weight % Ni, or any one or more elements being selected from the first group and any one or more elements being selected from a second group consisting of 0.2 to 5 weight % Zr, 0.2 to 5 weight % Sc, 0.2 to 10 weight % Li, and 0.2 to 5 weight % V, and a balance being Al, wherein the aluminum alloy contains no added Ti.

7. The method for manufacturing the aluminum alloy additive manufacturing product according to claim 5, wherein the additive manufacturing is performed with a measurement temperature of a substrate plate controlled to 150 to 300° C., and when depositing the metal powder, the metal powder is placed on the substrate plate.

8. A method for manufacturing an aluminum alloy additive manufacturing product, comprising performing additive manufacturing including depositing a metal powder, the metal powder being made of an aluminum alloy containing:

Fe and Mn wherein a total weight of Fe and Mn is in a range of from 2 to 10 weight %, Si in an amount that is in a range of from 4 to 30 weight %, optionally additive components containing any one or more elements being selected from a first group consisting of 0.5 to 5 weight % Mg, 0.5 to 5 weight % Cu, and 0.5 to 3 weight % Ni, or any one or more elements being selected from the first group and any one or more elements being selected from a second group consisting of 0.2 to 5 weight % Zr, 0.2 to 5 weight % Sc, 0.2 to 10 weight % Li, and 0.2 to 5 weight % V, and a balance being Al, wherein a measurement temperature of a substrate plate during the additive manufacturing is controlled to exceeding 250° C. and 450° C. or less, wherein the aluminum alloy contains no added Ti.

9. The method for manufacturing the aluminum alloy additive manufacturing product according to claim 6, wherein the additive manufacturing is performed with a measurement temperature of a substrate plate controlled to 150 to 300° C., and when depositing the metal powder, the metal powder is placed on the substrate plate.

* * * * *

UNITED STATES PATENT AND TRADEMARK OFFICE
CERTIFICATE OF CORRECTION

PATENT NO. : 11,555,229 B2
APPLICATION NO. : 16/665832
DATED : January 17, 2023
INVENTOR(S) : Mitsuru Adachi et al.

It is certified that error appears in the above-identified patent and that said Letters Patent is hereby corrected as shown below:

On the Title Page

(73) Assignees should read:
KOIWAI CO., LTD., Odawara (JP);
TOYO ALUMINIUM KABUSHIKI KAISHA, Osaka (JP)

Signed and Sealed this
Eighteenth Day of April, 2023

Katherine Kelly Vidal
*Director of the United States Patent and Trademark Office*